(12) United States Patent
Auerbach et al.

(10) Patent No.: US 11,763,176 B1
(45) Date of Patent: Sep. 19, 2023

(54) SEARCH AND QUERY IN COMPUTER-BASED REASONING SYSTEMS

(71) Applicant: Diveplane Corporation, Raleigh, NC (US)

(72) Inventors: Michael Auerbach, Raleigh, NC (US); Michael Resnick, Raleigh, NC (US); Christopher James Hazard, Durham, NC (US)

(73) Assignee: Diveplane Corporation, Raleigh, NC (US)

( * ) Notice: Subject to any disclaimer, the term of this patent is extended or adjusted under 35 U.S.C. 154(b) by 447 days.

(21) Appl. No.: 16/796,258

(22) Filed: Feb. 20, 2020

Related U.S. Application Data

(60) Provisional application No. 62/848,729, filed on May 16, 2019.

(51) Int. Cl.
*G06N 5/04* (2023.01)
*G06F 16/245* (2019.01)
*G06F 16/22* (2019.01)

(52) U.S. Cl.
CPC ........... *G06N 5/04* (2013.01); *G06F 16/2264* (2019.01); *G06F 16/245* (2019.01)

(58) Field of Classification Search
CPC ....................................................... G06N 5/04
USPC ....................................................... 707/600
See application file for complete search history.

(56) References Cited

U.S. PATENT DOCUMENTS

| | | |
|---|---|---|
| 4,935,877 A | 6/1990 | Koza |
| 5,581,664 A | 12/1996 | Allen et al. |
| 6,282,527 B1 | 8/2001 | Gounares et al. |
| 6,741,972 B1 | 5/2004 | Girardi et al. |
| 7,873,587 B2 | 1/2011 | Baum |
| 9,489,635 B1 | 11/2016 | Zhu |
| 9,922,286 B1 | 3/2018 | Hazard |
| 10,459,444 B1 | 10/2019 | Kentley-Klay |
| 2001/0049595 A1 | 12/2001 | Plumer et al. |

(Continued)

FOREIGN PATENT DOCUMENTS

| | | |
|---|---|---|
| WO | WO2017057528 | 4/2017 |
| WO | WO2017189859 | 11/2017 |

OTHER PUBLICATIONS

Abdi, "Cardinality Optimization Problems", The University of Birmingham, PhD Dissertation, May 2013, 197 pages.

(Continued)

*Primary Examiner* — Syling Yen
(74) *Attorney, Agent, or Firm* — Dority & Manning, P.A.

(57) ABSTRACT

Techniques for improved searching and querying in computer-based reasoning systems are discussed and include receiving multiple new multidimensional data element to store in a computer-based reasoning data model; determining a feature bucket for each feature of each data element and storing a reference identifier in the feature bucket(s). A query on the computer-based reasoning system includes input data element (e.g., an actual data element, or a set of restrictions on features). For each feature in the input data element, feature buckets are determined, candidate results are determined based on whether cases have related feature buckets, and the results are determined based at least in part on the candidate results. In some embodiments, control of controllable systems may be caused based on the results.

20 Claims, 6 Drawing Sheets

(56) References Cited

U.S. PATENT DOCUMENTS

| | | |
|---|---|---|
| 2004/0019851 A1 | 1/2004 | Purvis et al. |
| 2005/0137992 A1 | 6/2005 | Polak |
| 2006/0001952 A1 | 8/2006 | Bonabeau et al. |
| 2008/0153098 A1 | 6/2008 | Rimm et al. |
| 2008/0307399 A1 | 12/2008 | Zhou et al. |
| 2009/0006299 A1 | 1/2009 | Baum |
| 2009/0144704 A1 | 6/2009 | Niggemann et al. |
| 2010/0106603 A1 | 4/2010 | Dey et al. |
| 2010/0287507 A1 | 11/2010 | Paquette et al. |
| 2011/0060895 A1 | 3/2011 | Solomon |
| 2011/0072206 A1* | 3/2011 | Ross ............... G06F 3/0604 711/108 |
| 2011/0161264 A1 | 6/2011 | Cantin |
| 2011/0225564 A1 | 9/2011 | Biswas et al. |
| 2012/0278321 A1* | 11/2012 | Traub ............... G06F 16/3331 707/E17.014 |
| 2013/0006901 A1 | 1/2013 | Cantin |
| 2013/0339365 A1 | 12/2013 | Balasubramanian et al. |
| 2016/0055427 A1 | 2/2016 | Adiaoute |
| 2017/0010106 A1 | 1/2017 | Shashua et al. |
| 2017/0012772 A1 | 1/2017 | Mueller |
| 2017/0053211 A1 | 2/2017 | Heo et al. |
| 2017/0091645 A1 | 3/2017 | Matus |
| 2017/0161640 A1 | 6/2017 | Shamir |
| 2017/0236060 A1 | 8/2017 | Ignatyev |
| 2018/0072323 A1 | 3/2018 | Gordon et al. |
| 2018/0089563 A1 | 3/2018 | Redding et al. |
| 2018/0235649 A1 | 8/2018 | Elkadi |
| 2018/0336018 A1 | 11/2018 | Lu et al. |
| 2019/0147331 A1 | 5/2019 | Arditi |

OTHER PUBLICATIONS

Abouinaga, "Generating Synthetic Complex-structured XML Data", Proceedings of the Fourth International Workshop on the Web and Databases, WebDB 2001, Santa Barbara, California, USA, May 24-25, 2001, 6 pages.

Abramson, "The Expected-Outcome Model of Two-Player Games", PhD Thesis, Columbia University, New York, New York, 1987, 125 pages.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the 2nd International Symposium on Information Theory, Sep. 2-8, 1971, Tsahkadsor, Armenia, pp. 267-281.

Alhaija, "Augmented Reality Meets Computer Vision: Efficient Data Generation for Urban Driving Scenes", arXiv:1708.01566v1, Aug. 4, 2017, 12 pages.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Anderson, "Synthetic data generation for the internet of things," 2014 IEEE International Conference on Big Data (Big Data), Washington, DC, 2014, pp. 171-176.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Bull, Haploid-Diploid Evolutionary Algorithms: The Baldwin Effect and Recombination Nature's Way, Artificial Intelligence and Simulation of Behaviour Convention, Apr. 19-21, 2017, Bath, United Kingdom, pp. 91-94

Cano et al., "Evolutionary Stratified Training Set Selection for Extracting Classification Rules with Tradeoff Precision-Interpretability" Data and Knowledge Engineering, vol. 60, 2007, pp. 90-108.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.

Chomboon et al., An Empirical Study of Distance Metrics for k-Nearest Neighbor Algorithm, 3rd International Conference on Industrial Application Engineering, Kitakyushu, Japan, Mar. 28-31, 2015, pp. 280-285.

Colakoglu, "A Generalization of the Minkowski Distance and a New Definition of the Ellipse", arXiv:1903.09657v1, Mar. 2, 2019, 18 pages.

Dernoncourt, "MoocViz: A Large Scale, Open Access, Collaborative, Data Analytics Platform for MOOCs", NIPS 2013 Education Workshop, Nov. 1, 2013, Lake Tahoe, Utah, USA, 8 pages.

Ding, "Generating Synthetic Data for Neural Keyword-to-Question Models", arXiv:1807.05324v1, Jul. 18, 2018, 12 pages.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

Fathony, "Discrete Wasserstein Generative Adversarial Networks (DWGAN)", OpenReview.net, Feb. 18, 2018, 20 pages.

Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.

Gao et al., "Efficient Estimation of Mutual Information for Strongly Dependent Variables", 18th International Conference on Artificial Intelligence and Statistics, San Diego, California, May 9-12, 2015, pp. 277-286.

Gehr et al., "AI2: Safety and Robustness Certification of Neural Networks with Abstract Interpretation", 39th IEEE Symposium on Security and Privacy, San Francisco, California, May 21-23, 2018, 16 pages.

Gemmeke et al., "Using Sparse Representations for Missing Data Imputation in Noise Robust Speech Recognition", European Signal Processing Conference, Lausanne, Switzerland, Aug. 25-29, 2008, 5 pages.

Ghosh, "Inferential Privacy Guarantees for Differentially Private Mechanisms", arXiv:1603:.01508v1, Mar. 4, 2016, 31 pages.

Goodfellow et al., "Deep Learning", 2016, 800 pages.

Google AI Blog, "The What-If Tool: Code-Free Probing of Machine Learning Models", Sep. 11, 2018, https://pair-code,github.io/what-if-tool, retrieved on Mar. 14, 2019, 5 pages.

Gottlieb et al., "Near-Optimal Sample Compression for Nearest Neighbors", Advances in Neural Information Processing Systems, Montreal, Canada, Dec. 8-13, 2014, 9 pages.

Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.

Hastie et al., "The Elements of Statistical Learning", 2001, 764 pages.

Hazard et al, "Natively Interpretable Machine Learning and Artificial Intelligence: Preliminary Results and Future Directions", arXiv:1901v1, Jan. 2, 2019, 15 pages.

Hinneburg et al., "What is the Nearest Neighbor in High Dimensional Spaces?", 26th International Conference on Very Large Databases, Cairo, Egypt, Sep. 10-14, 2000, pp. 506-515.

(56) References Cited

OTHER PUBLICATIONS

Hmeidi et al., "Performance of KNN and SVM Classifiers on Full Word Arabic Articles", Advanced Engineering Informatics, vol. 22, Issue 1, 2008, pp. 106-111.
Hoag "A Parallel General-Purpose Synthetic Data Generator", ACM SIGMOID Record, vol. 6, Issue 1, Mar. 2007, 6 pages.
Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.
Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.
Indyk et al., "Approximate Nearest Neighbors: Towards Removing the Curse of Dimensionality", Procedures of the 30th ACM Symposium on Theory of Computing, Dallas, Texas, May 23-26, 1998, pp. 604-613.
International Search Report and Written Opinion for PCT/US2018/047118, dated Dec. 3, 2018, 9 pages.
International Search Report and Written Opinion for PCT/US2019/026502, dated Jul. 24, 2019, 16 pages.
International Search Report and Written Opinion for PCT/US2019/066321, dated Mar. 19, 2020, 17 pages.
Internet Archive, "SystemVerilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.
Internet Archive, "SystemVerilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.
Kontorovich et al., "Nearest-Neighbor Sample Compression: Efficiency, Consistency, Infinite Dimensions", Advances in Neural Information Processing Systems, 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.
Lukaszyk, "A New Concept of Probability Metric and its Applications in Approximation of Scattered Data Sets", Computational Mechanics, vol. 33, 2004, pp. 299-304.
Lukaszyk, "Probability Metric, Examples of Approximation Applications in Experimental Mechanics", PhD Thesis, Cracow University of Technology, 2003, 149 pages.
Mann et al., "On a fest of Whether One or two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Montanez, "SDV: An Open Source Library for Synthetic Data Generation", Massachusetts Institute of Technology, Master's Thesis, Sep. 2018, 105 pages
Negra, "Model of a Synthetic Wind Speed Time Series Generator", Wind Energy, Wiley Interscience, Sep. 6, 2007, 17 pages.
Nguyen et al., "NP-Hardness of $\zeta$ 0 Minimization Problems: Revision and Extension to the Non-Negative Setting", 13th International Conference on Sampling Theory and Applications, Jul. 8-12, 2019, Bordeaux, France, 4 pages.
Olson et al., "PMLB: A Large Benchmark Suite for Machine Learning Evaluation and Comparison", arXiv:1703.00512v1, Mar. 1, 2017, 14 pages.
Patki, "The Synthetic Data Vault: Generative Modeling for Relational Databases", Massachusetts Institute of Technology, Master's Thesis, Jun. 2016, 80 pages.
Patki, "The Synthetic Data Vault", 2016 IEEE International Conference on Data Science and Advanced Analytics (DSAA), Oct. 17-19, 2016, Montreal, QC, pp. 399-410.
Pedregosa et al., "Machine Learning in Python", Journal of Machine Learning Research, vol. 12, 2011, pp. 2825-2830.
Pei, "A Synthetic Data Generator for Clustering and Outlier Analysis", The University of Alberta, 2006, 33 pages.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner el al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.
Prakosa "Generation of Synthetic but Visually Realistic Time Series of Cardiac Images Combining a Biophysical Model and Clinical Images" IEEE Transactions on Medical Imaging, vol. 32, No. 1, Jan. 2013, pp. 99-109.
Priyardarshini, "WEDAGEN: A synthetic web database generator", International Workshop of Internet Data Management (IDM'99), Sep. 2, 1999, Florence, IT, 24 pages.
Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Reiter, "Using CART to Generate Partially Synthetic Public Use Microdata" Journal of Official Statistics, vol. 21, No. 3, 2005, pp. 441-462.
Ribeiro et al., "'Why Should I Trust You': Explaining the Predictions of Any Classifier", arXiv:1602.04938v3, Aug. 9, 2016, 10 pages.
Rosenberg et al., "Semi-Supervised Self-Training of Object Detection Models", IEEE Workshop on Applications of Computer Vision, 2005, 9 pages.
Schaul et al., "Universal Value Function Approximators", International Conference on Machine Learning, Lille, France, Jul. 6-11, 2015, 9 pages.
Schlabach et al., "FOX-GA: A Genetic Algorithm for Generating and ANalayzing Battlefield COurses of Action", 1999 MIT.
Schreck, "Towards an Automatic Predictive Question Formulation", Massachusetts Institute of Technology, Master's Thesis, Jun. 2016, 121 pages.
Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.
Schuh et al., "Improving the Performance of High-Dimensional KNN Retrieval Through Localized Dataspace Segmentation and

(56) References Cited

OTHER PUBLICATIONS

Hybrid Indexing", Proceedings of the 17th East European Conference, Advances in Databases and Information Services, Genoa, Italy, Sep. 2013, pp. 344-357.
Schuh et al., "Mitigating the Curse of Dimensionality for Exact KNN Retrieval", Proceedings of the 26th International Florida Artificial Intelligence Research Society Conference, St. Pete Beach, Florida, May 22-24, 2014, pp. 363-368.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Smith, "FeatureHub: Towards collaborative data science", 2017 IEEE International Conference on Data Science and Advanced Analytics (DSAA), Oct. 19-21, 2017, Tokyo, pp. 590-600.
Stephenson et al., "A Continuous Information Gain Measure to Find the Most Discriminatory Problems for AI Benchmarking", arxiv. org, arxiv.org/abs/1809.02904v2, retrieved on Aug. 21, 2019, 8 pages.
Stoppiglia et al., "Ranking a Random Feature for Variable and Feature Selection" Journal of Machine Learning Research, vol. 3, 2003, pp. 1399-1414.
Sun et al., "Fuzzy Modeling Employing Fuzzy Polyploidy Genetic Algorithms", Journal of Infonnation Science and Engineering, Mar. 2002, vol. 18, No. 2, pp. 163-186.
Sun, "Learning Vine Copula Models for Synthetic Data Generation", arXiv:1812.01226v1, Dec. 4, 2018, 9 pages.
Surya el al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7th international Conference on Hybrid Artificial Intelligent Systems, Salamanca, Spain, Mar. 28-30, 2012, 38 pages.
Tran, "Dist-GAN: An Improved GAN Using Distance Constraints", arXiv:1803.08887V3, Dec. 15, 2018, 20 pages.
Trautmann et al., "On the Distribution of the Desirability Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Viera. "Generating Synthetic Sequential Data using GANs", Medium: Toward AI, Jun. 29, 2020, 31 pages.
Wachter et al., "Counterfactual Explanations Without Opening the Black Box: Automated Decisions and the GDPR", Harvard Journal of Law and Technology, vol. 31. No. 2, Spring 2018, 47 pages.
Wang et al., "Falling Rule Lists" 18th International Conference on Artificial Intelligence and Statistics, San Diego, California, May 9-12, 2015, 10 pages.
Wei et al., "An Operation-Time Simulation Framework for UAV Swarm Configuration and Mission Planning", 2013.
Weselkowski et al., "TraDE: Training Device Selection via Multi-Objective Optimization", IEEE 2014.
Wu, "The Synthetic Student: A Machine Learning Model to Simulate MOOC Data", Massachusetts Institute of Technology, Master's Thesis, May 2015, 103 pages.
Xiao, "Towards Automatically Linking Data Elements", Massachusetts Institute of Technology, Master's Thesis, Jun. 2017, 92 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

\* cited by examiner

SEARCH AND QUERY IN COMPUTER-BASED REASONING SYSTEMS

PRIORITY CLAIM

This application claims priority to and the benefit of U.S. Provisional Patent Application No. 62/848,729 filed May 16, 2019. U.S. Provisional Patent Application No. 62/848,729 is hereby incorporated by reference in its entirety.

FIELD OF THE INVENTION

The present invention relates to computer-based reasoning systems and more specifically to searching and querying in computer-based reasoning systems.

BACKGROUND

Searching in computer systems is both extremely important and consumes much computation. One example of a computer system where search is important is in databases. Another example is computer-based reasoning systems, which can be used to predict outcomes based on input data. For example, given a set of input data, a computer-based reasoning system can predict an outcome or make a decision. One of the hardest issues to overcome in searching, especially more complex searches like similarity searches, Lebesgue space searches, probability searches with residuals, etc., especially in computer-based reasoning systems is, however, that the computation required for searching in computer-based reasoning systems increases dramatically with the amount of underlying data.

The techniques herein overcome these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims provide a summary of the invention.

DETAILED DESCRIPTION

Figure 1:
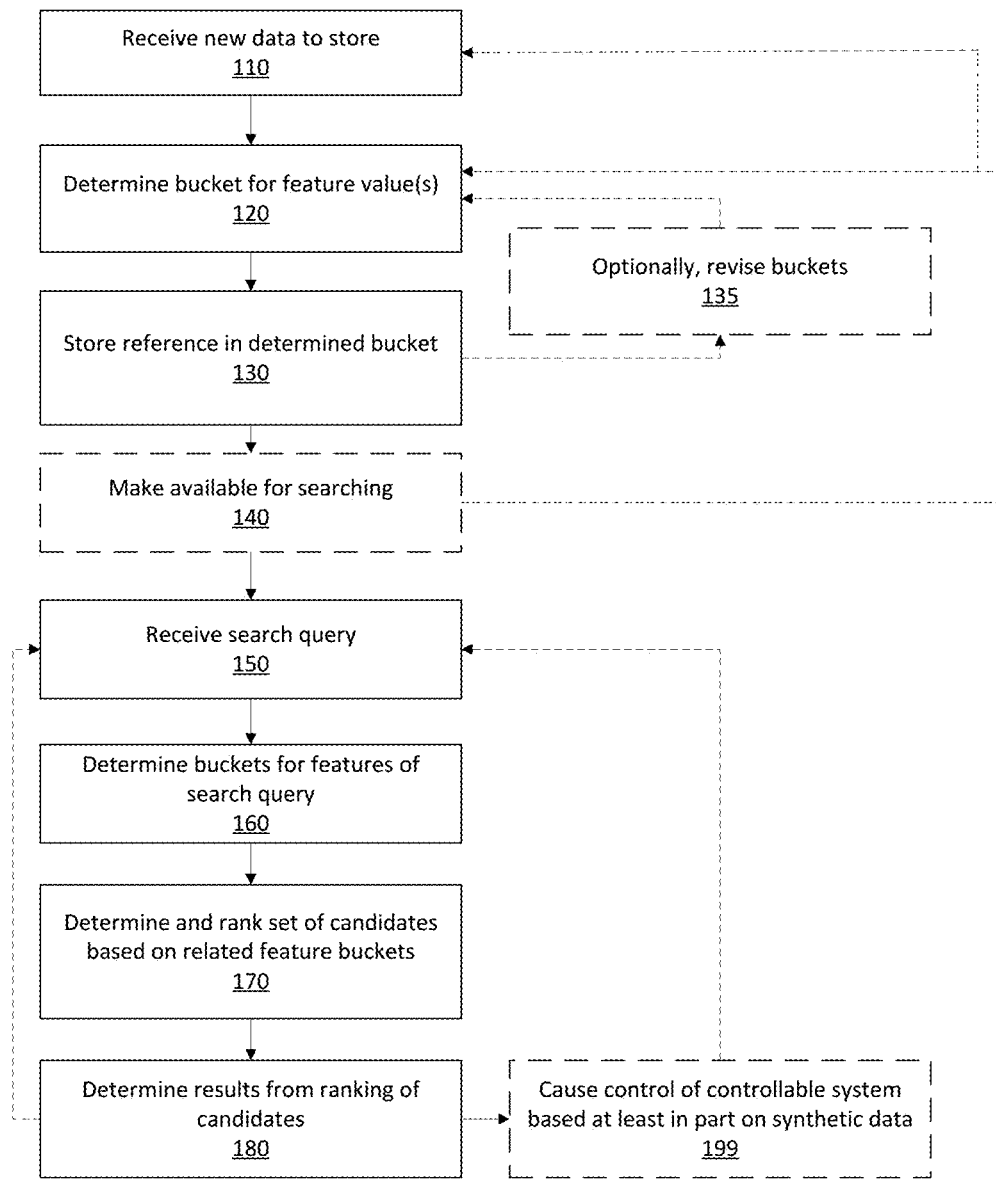
FIG. 1 is a flow diagram depicting example processes for improved searching and querying in computer-based reasoning systems.

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

General Overview

The techniques herein provide for improved searching and querying in computer-based reasoning systems. In some embodiments, the techniques include creating a hash (such as an ordered hash) of feature values on a per-case, per-feature basis for later searching and querying of multidimensional data (for a set of data elements with m features and n total cases in the dataset), the compute complexity bound for the search (including similarity searches, Lebesgue space searches, probability searches with residuals, etc.) may be, in some embodiments, at best constant time $O(1)$ and at worst logarithmic $O(m*\log(n))$. In various embodiments, the terms "data element", "data case", and "case" may be used interchangeably. In addition to ordered hashes, various embodiments use other (e.g., non-ordered) hashes, and the results of that hashing can later be sorted into a linear ordered structure.

Embodiments may include, on a per-case, per-feature basis, creating ordered feature buckets of one or more values each where the values stored in the feature bucket meet the criteria values in feature bucket $B_i$ are all greater than all values in $B_{i-1}$ and are all less than values in feature bucket $B_{i+1}$. The number of feature buckets may be increased or decreased as needed, but may, in some embodiments, be a fixed number (once adjusted). Further, in some embodiments, the number of values stored in a feature bucket may be adjusted, and may be fixed once adjusted.

In some embodiments, the techniques look for closest cases, and as described more elsewhere herein, a "close" or "closest" case may be a case with features that minimize a distance function, such as Euclidean distance, Minkowski distance, Damerau-Levenshtein distance, Kullback-Leibler divergence, 1-Kronecker delta, and/or any other distance measure, metric, semimetric, pseudometric, premetric, index, etc. Given an input context or other search criteria, searching for the set of closest cases may, in some embodiments, include starting with one of the input criteria (e.g., a feature value), determining the hash of the value (in which feature bucket the value would be placed) in order to determine the other cases that have that value. This may be repeated for each value, and those cases or data with the most shared values are considered as candidate closest cases. Some embodiments include expanding the search for nearest cases to neighbors, and/or computing distances of the candidate cases in order to determine and return the k nearest neighbors. The k nearest neighbors may then be used in a decision system to determine a prediction or action. The prediction or action may then, in some embodiments, be used to control a controllable system.

Embodiments for Improved Searching and Querying in Computer-Based Reasoning Systems Some embodiments use a feature-bucketed data structure, such as a unique separable box filter tree (which is one example of a separable box filter data structure—"SBFDS"), which may be a tree-like spatial data structure that uses hashed buckets (such as an ordered hash buckets) for efficient indexing and querying on large sets of high-dimensional data. Various embodiments combine a strictly-oriented linear hash system with set-bounds limiting routines to provide KNN (k nearest neighbors) and ANN (approximate nearest neighbors) results in constant time. This may allow insertion of a new data elements into the feature-bucketed data structure (such as a SBFDS) in logarithmic time worst case, constant time best case, while deletion may be accomplished in constant time.

The amount of time it takes to insert, delete, and search for data is of great importance where the training data may be voluminous, and may cause insertion, deletion, and querying to be unduly slow for use in modern applications.
Examples of Strictly Oriented Linear Hash In some embodiments, a strictly-oriented linear hash (SOLH) may be used as the structure for the feature-bucketed data structure, such as a SBFDS; and a SOLH may be a Hash method/map that enforces that for each key $k_i$ mapped to feature bucket at index $b_i$, for any other index j, if $k_j > k_i$, then $b_j > b_i$ and if $k_j < k_i$, then $b_j < b_i$ assuming that $k_j$ and $k_i$ do not map to the same bucket. Such a hash system means that the actual feature buckets of the hash are in sorted order with respect to all the feature values (or a projective hyperplane) at all times, and the hashing function H(x) either ensures this sorted order on output, or is dynamically adjusted (e.g., sorted) to ensure sorted output order.

One embodiment of a SOLH would be an array of length 100 for a dataset of integers in [0, 100). Each bucket then has a single integer key and the hash function H(x) is simply H(x)=x. A SOLH for a dataset of real numbers [−128,128] could be accomplished by using hashing function:

$$H(x) = \text{floor}((128-(-128))*x/\text{num\_specified\_buckets})$$

In some embodiments, an additional one-dimensional cone map could be used for constant time traversal of buckets without needing to check empty buckets between neighbors. These maps are computed in constant time incrementally during entry insertion. For example, for each bucket (representing a key or set of keys), an additional number could be stored, h (for horizon). h may be the count of empty buckets to the right of this feature bucket. During a traversal of buckets, the techniques may skip the next h buckets in order to arrive at the next non-empty bucket in sorted order.

Some embodiments herein use feature buckets that contain a range of key values instead of individual values. For example, feature bucket 0 may contain keys in [0,10), feature bucket 1 in [10,20) etc. Further, in some embodiments, the feature buckets may include irregular intervals. For example, bucket 0 may contain keys in the range [0, 8), bucket 1 may contain keys in the range [8, 29), etc. Using these feature buckets, multiple key ranges can each be grouped into single buckets.

In some embodiments, it is beneficial to use feature buckets that represent ranges when it allows inexpensive searching for nearby keys of the target key. In some embodiments, when using the feature-bucketed data structure, such as a SBFDS, with ranges for each feature bucket, it may be beneficial to treat values the in the feature bucket as a set of "nearby keys" for each key in the feature bucket. As discussed more herein, knowing keys in nearby buckets can be beneficial (e.g., where a search is expanded to find good neighbors and populate the partial sums). In some embodiments, when using the feature-bucketed data structure, such as a SBFDS, with exact key search instead, it may be beneficial to use individual keyed buckets since the values in the bucket may represent only those data elements or cases that have a feature of that same value (if any).

In some embodiments, use of feature buckets may include sorting the keys within each feature bucket (e.g., if there are a range of values in the feature bucket). For example, a SOLH scheme could use this to ensure each actual key is in sorted order within the feature bucket.

In some embodiments, a feature-bucketed data structure, such as a SBFDS, using SOLH may include, for insert and retrieval use of a hash function such as:

$$H(x)=((x-\text{min\_value})/(\text{max\_value}-\text{min\_value}))* \\ \text{number\_of\_buckets}*\text{max\_allowed\_} \\ \text{values\_per\_key}$$

where, in various embodiments, max_allowed_values_per_key=log(number_of_buckets) (or some function thereof).

After computing H(x), the techniques may start at data index H(x) and search for the first empty slot/index in the data vector, or stop if we have searched more than max_allowed_values_per_key slots/indices. If an empty slot/index is found, then the value (and possibly the key and/or a reference to the data element associated with the key) may be written to that slot. In embodiments where ranges of values are stored in feature buckets, then the value (and possibly the key and/or a reference to the data element associated with the key) may be inserted into the feature bucket by sorting the bucket itself as the new value (and possibly the key and/or a reference to the data element associated with the key) is inserted. Various techniques may be used for this insertion, such as an insertion sort, Shell sort, etc. If the feature bucket has reached the max_allowed_values_per_key, then the hash may and/or feature buckets may be modified to allow for more feature buckets and/or more values per feature bucket. For example, max_allowed_values_per_key and/or number_of_buckets may be doubled, the values in each feature bucket may optionally be redistributed, etc. As one example embodiment of expanding, all current entries at feature bucket I may be copied to a new feature bucket i*2 and all odd feature buckets may be left "empty."

In some embodiments, the ranges for feature buckets may be extended (e.g., combining more than one feature bucket together). For example, a multiple of feature bucket size to the left and right of current range that is required to fit new min/max (where min is the lowest of the new set of values and max is the highest of the new values) may be determined and a feature bucket may be expanded by a right+left expansion amount. Entries may then be shifted over by left expansion amount. All other entries may be set to an "empty" state.

In some embodiments, the range may be revised and entries may be rehashed. This may involve creating a new structure for the hash in the feature-bucketed data structure, such as a SBFDS, with new parameters, and then rehashing each entry into the new structure, possibly without reference to previous hashing.

In some embodiments, the data structure cannot guarantee that information will not be lost when shrinking the structure. In various embodiments, expansion by multiples and/or factors of the current size may ensure no information loss. A total rehash may be necessary for shrinking the structure without information loss.

In some embodiments, the structure for the feature-bucketed data structure, such as a SBFDS, can grow very quickly with data size, especially when data outliers exist. As such, the technique here can be yet more beneficial the more uniformly the data is distributed. In some embodiments, feature-bucketed data structures other than the SBFDS can be used to enforce a hash as long as they can fulfill requirements of techniques or embodiments. Such data structures may include doubly linked lists, singly linked lists, hashes, arrays, stacks, queues, sets, etc. For example, a doubly linked list can allow ordered storage and bidirectional searching, and allow growth and shrinkage in O(1)/constant time (as discussed herein). In some embodiments, a combination of data structures may also be used as the SBFDS, such as combining two or more of doubly linked lists, singly linked lists, hashes, arrays, stacks, queues, sets, etc. This may allow the benefits of each type of data structure, while avoiding some of the drawbacks of each. As one example, a doubly linked list can be used in combination with a hash, allowing the benefits of the data structures used in combination, such as faster searching and faster traversal discussed herein. In some embodiments, the choice of which data structure(s) to use may be made based on the requirements (e.g., computing and/or memory, and related tradeoffs). For example, a doubly linked list may take up significantly more memory than a hash due to storage of the 2 pointers per bucket.

Additional Strictly-Oriented Linear Hash Embodiments

In some embodiments, the techniques include using a binary tree to sort the keys and then "linearize" the tree, by association, into a sorted vector by iterating over each value, in sorted order, in the tree and writing into the vector. In some embodiments, this may be efficient to implement and may provide desirable results, including good performance and desired output.

The techniques may include hashing the keys into a flat hash with values set to the index into the sorted vector discussed elsewhere herein. This sorted vector may include the collection of values (e.g., references to data elements) for that key. In some embodiments, we do not use a map/hash from key to set of values directly, when it then becomes expensive or impossible to discover the neighbor keys of a given key. The techniques may allow a search, in constant time, for the neighbor keys of a key, in addition to the values of any given key, at the expense of an O(log(n)) time preprocessing step (which may include, in some embodiments, sorting into the vector). As discussed elsewhere herein, the preprocessing may be accomplished, in some embodiments, in O(1) or "constant" time. Further, in some embodiments, preprocessing is eliminated and the sorted insertion takes O(1) constant time.

Example Embodiments Using Dual Hashing

In some embodiments, for every case or data element in the model, there is a set of feature values. We will refer to the "case", "data case" or "data element" as "id" (e.g., the case is associated with an id or identification number). The embodiments may include:

A. A set of hash maps, one per feature/dimension, where the keys are the feature values, and the values are indices into the sorted vector (described in B below).

B. A sorted vector of (feature value+sub-vector), sorted by feature value, where each parent vector is a "bucket" representing a single feature value, and the sub-vectors are the set of associated case ids.

In some embodiments, with these two data structures, we can now "hop around" our data in constant time in many ways. For example, given a case, we can find the feature buckets it is in (one per feature) in constant time using the hashes in (A) and by looking up each of the case's feature values in that hash. Consider another example where we want to find all cases with a certain feature value: the techniques may include looking up the hash value for the feature value and then index into (B), giving us the entire set of case ids that have that specific feature value.

In some embodiments, the techniques may answer the query "given a case, what are its feature values," as this is simply the inherent mapping provided by storing sets of cases with feature values (the input to the feature-bucketed data structure, such as a SBFDS/model source data). Various embodiments also answer the query, "given a feature value, find the cases that have that value"- and can calculate that in constant time.

In some embodiments, the techniques may define input data pairs <k, v> where k is the key and v is the associated value (e.g., the case id). Hashing a data pair <k, v>, may include hashing the value for k, and inserting the pair into the subsequent location based on the hashing of just k alone. In some embodiments, a hash of a function of both k and v may be used.

In some embodiments, the techniques include using a projective hashing function, $x=P(k, v)$, where x is the intermediate transpositional projective space value that maps groups of k that are within a desired range to the same output value. This hashing maps the key to a specific virtual bucket (which may be the actual bucket, as discussed elsewhere herein) index. Then hash $H(v, x)=y$, where y is the index into the sorted vector (B, above) that maintains the sorted order of (B) given the original inputs k; as such v becomes the key for H and x is thus the transpositional value. Hash H completes the transformation taking the intermediate projective value and placing it in a sorted order given the input parameters. In some embodiments, when (B) is already sorted, then $H(v, x)$ is simply the known index into the sorted vector (B) rather than a second hash/transform function.

For example, $P(k, v)$ may map sets of similar/within-specified-range keys into a single virtual bucket. $H(v, x)$ may map each of those virtual buckets to the correct index of the actual data structure to preserve sorted order with respect to the key value or key ranges.

Various embodiments of the techniques herein, including the dual hashing embodiments may allow discovery of the bucket for a value v in constant time, while also allowing storage into each bucket in sorted order at all times. In various embodiments, when $P(k, v)$ is a projection function, the output x may not be one-to-one with the input. For example, multiple k, v pairs may exist in the same projection. The techniques may handle this efficiently by using one-dimensional vectors of v's (or other data structures) as the bucket value, rather than a single v-value. Such embodiments may produce very efficient searches.

In some embodiments, in order to handle high-dimensional data, the techniques use multiple SOLHs in consort. For example, one setup might use k SOLHs where k is the dimensionality of the data. Each SOLH in this example may be projected simply against the origin-axis line for dimension $k_i$ for i over 1.number of features. In some embodiments, a single SOLH could be used to sort k-dimensional data, provided that a proper duality of hashing functions can be generated to ensure the requirements specified above (which is likely difficult).

In some embodiments, in order to maintain dynamic indexing performance, the techniques may or may not include dimensional analysis of the data. For example, the techniques may include separating the k dimensions as discussed herein. In some embodiments, the techniques include grouping projections by output distance influence discussed elsewhere herein. Such embodiments may efficiently produce search results.

Example Box Filtering Systems

In some embodiments, the techniques provide a database that can provide constant time lookup for values against a key, and insertion into a linearly sorted system. In some embodiments, the techniques can include expanded volumes of keys instead of individual keys. For example, $P(k, v)$ may share a bucket with any number of P(k, v)+n, as long as the neighboring buckets still maintain the strict linear ordering. As a more specific example, a bucket (with bucket index=i) might contain keys 1 and 1.5, and the next bucket (e.g., bucket index=I+1) may store values from keys 1.6, 1.7 and 2.0.

This expanded volume system may allow us to cluster similar keys together into the same bucket (although in some embodiments the techniques may include using a non-expanded bucket with n neighbors as a result instead). A benefit of these techniques is that, computationally in some embodiments, only one H(v, x) is computed. for all keys in the same bucket since one single bucket holds the entire expanded volume. For example, computing the H(v, x) may be called "index remapping," and may take the initial hash value and mapping it to the correct sorted index, which may be sorted with respect to the key/feature ranges. Further, in some embodiments, the techniques may cache H(v, x) and reuse it for each k that maps to the same expanded bucket.

As noted, in various embodiments, we can consider a bucket and its n-neighbors as an "expanded result." Such a result provides values whose keys are numerically similar, bound by our n-value or by using direct numeric bounds. One may refer to these expanded volumes in shorthand as boxes, hence the name of the box filter data structure. Further, some embodiments use a Sweep Tree as a linear hash system. In some embodiments, the techniques apply a moving box filter kernel to the Sweep Tree to obtain the ANN elements.

Feature-Bucketed Data Structure Topology Examples

Figure 5:
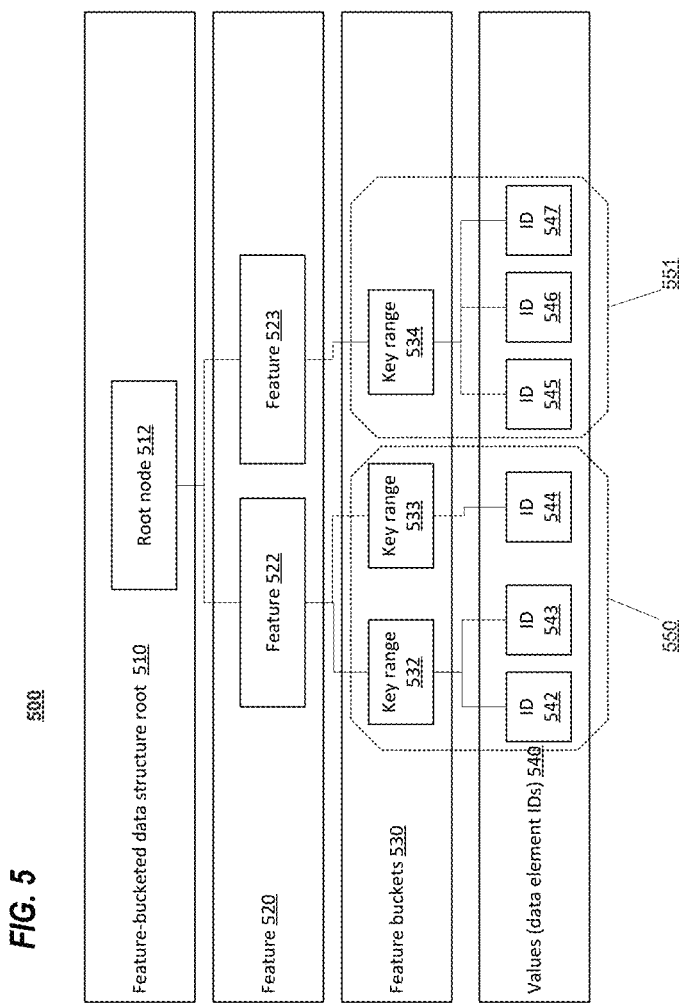
FIG. 5 is a block diagram depicting a multi-hash tree for improved searching and querying in computer-based reasoning systems.

In some embodiments, a feature-bucketed data structure, such as a SBFDS, is a multi-hash tree, where each dimension of data has its own hash tree. For example, FIG. 5 is a block diagram depicting an example feature-bucketed data structure, such as a SBFDS, 500, in this embodiment a multi-hash tree, for improved searching and querying in computer-based reasoning systems. In the particular example, the root node 512 of the feature-bucketed data structure, such as a SBFDS, 500 has two features 522 and 523. In various embodiments more features 520-523 may be included. Each feature 522 and 523 may have its keys distributed into one or more key ranges 532-534. And each key range 532-534 may have therewith associated keys that are associated with values or identifiers 542-547. Each of the values or identifiers 542-547 may be a reference or identifier for a data element, data element, case, etc. As discussed elsewhere herein, the elements in each structure 550 and 551 may be stored as sorted hash maps. In some embodiments, the storage of identifiers for data elements that have feature values in particular ranges may be useful for finding nearby neighbors of input data elements.

As used herein, the term "super bucket" is a broad term encompassing its plain and ordinary meaning, including buckets that use a key range (or set of ranges) including more than one key, rather than a single key (no range or unitary range). As used herein, the term "feature bucket" is a broad term encompassing its plain and ordinary meaning, and including, but not limited to a super bucket (with a range for keys) and/or a bucket containing a single key.

In some embodiments, feature buckets are defined as containers for the values in the feature-bucketed data structure, such as a SBFDS. Each bucket i is indexed by a range of key limit values, [$keylimit_i$, $keylimit_{i+1}$). For example, a bucket with key ranges [0,10) will contain all entries with keys [0,10); entries with a key larger or equal to 10 will be in the right neighbor bucket (or beyond). Entries with a key less than 0 will be in the left neighbor (or beyond). In some embodiments, the ranges and length of ranges are calibrated variables. For example, each key range may be a single key value [key, key]—in which case a bucket stores all entries with the same key and only that one key. As another example the key ranges may be split in equal partitions of the total length of entry key values (maximum−minimum)/number_of_buckets_desired. As such, each key range may be uniform and contain a fraction of the known range of key values $range_i=[(key_{min}+[i/num\_ranges]*(key_{max}-key_{min}))$, $(key_{min}+[(i+1)/num\_ranges]*(key_{max}-key_{min})))$. As another example, the ranges may be set to be non-uniform with respect to range numbers, and instead include a uniform number of values. Any other specific set of ranges may also be used, such as a set of ranges based on a distribution (e.g., using a normal distribution, the center range may be small, but still contain a high density of values, and the end ranges may be large but contain a low density of occurring values), etc.

In some embodiments, any selection of feature bucket key ranges and bucket count will work with the following restrictions:
A) each feature bucket is in order: all values in feature bucket i key range are greater than all values in feature bucket i−1's key range, all values in feature bucket i key range are less than all values in feature bucket i+1's key range, etc.
B) a bucket with key range r contains all entries that have a key within range r. No other buckets should contain a key within range r.

In some embodiments, inserting new data elements includes, for each feature f in the data element, insert entity id (a reference to the data element) into feature f's hash map. In some embodiments, this insertion may require O(number of features) computational resources to accomplish.

Example Embodiments of Searching for Data Elements

In some embodiments, searching may be accomplished as an approximation and/or an exact search. For example, in some embodiments, for each feature f in the input data element (e.g., the thing being searched for), the hash of the feature value is determined (call it $bucket_i$). The data element IDs for other data elements in the $bucket_i$ are added to an intermediate set of results. This computation may be an O(number of features) computation.

In some embodiments, the entities that share feature buckets with the input data element may be considered candidate data elements for a k nearest neighbors search.

In some embodiments, any orderable data elements may be used. For example, in some embodiments, for non-numeric but orderable objects (e.g., strings), the techniques determined use an order determined or set. As a few examples, for a string, the order may be character sum, natural comparison (e.g., alphabetic order based on characters in sequence), etc. If the data elements and order are multidimensional, e.g., order(a, b) the techniques may use a sum function that takes more than one variable or dimension of a variable. Then the techniques, in some embodiments, maintain that the following algebra holds for non-numeric data:
order(a, b)=>a is "1" less than b
order(a, c)=>a is "1" less than c
order(a, b+c)=>a is "2" less than b+c So, in some embodiments, many non-numeric comparisons will work with the techniques when they are given a simple ordering such as add, subtract, multiply, divide, etc.

Examples of Distance Functions

In some embodiments, after a set of candidate data elements to satisfy a k nearest neighbors search have been determined, the distance to the input data element may be determined. Any appropriate (e.g., monotonic) distance measure may be used, including Euclidean distance, Minkowski distance, Damerau-Levenshtein distance, Kullback-Leibler divergence, 1–Kronecker delta, and/or any other distance measure, metric, semimetric, pseudometric, premetric, index, etc.

As a specific example, a Minkowski distance measure may be used where the distance between two points in a Minkowski m-dimensional semimetric space may be defined using an equation, such as:

$$MinkowskiDistance(x, y) = \sum_{i=0}^{m} |x_i - y_i|^{p\frac{1}{p}}$$

where x and y may be vectors within the semi-metric space, and p the Minkowski exponent parameter. In some embodiments, the techniques omit the final 1/p exponentiation during the calculation of each distance measure and instead, will just be applied to the final search result since raising something to the 1/p power is computationally expensive and does not affect the ordering of sortable results due to the calculation preserving monotonicity. In some embodiments, if p=0, MinkowskiDistance (or other measure) may be replaced with Product(i=0,m)(|xi−yi|).

Examples of Bounding Distance Measures

In some embodiments, the techniques include determining maximum and minimum possible distances from data elements under consideration (e.g. input data elements) and other data elements in the model (or data base). This is useful when determining the k nearest neighbors or performing any other type of search. For example, if it can be determined that all of the k nearest neighbors to a input data elements will either have features in one or more particular feature buckets or will not have features in particular feature buckets, then the search for the k nearest neighbors can be performed more efficiently (in terms of computation, time, etc.).

In some embodiments, the techniques include determining the maximum (fMax) and minimum (fMin) values for each feature. The techniques may also include determining partial maximums (pMax) and partial minimums (pMin). For example, the maximum possible partial distance of a case point x and any other case point y in the database, pMax(x, i), may be the MinkowskiDistance without the outer exponent, such as $$pMax(x, i) = \sum_{i=0}^{m} \max(|x_i - fMax_i|, |x_i - fMin_i|)^p$$

In some embodiments, for a specific y, the relationship between MinkowskiDistance(x, y) and pMax may be:

MinkowskiDistance(x,y)≤pMax(x), if x=y, then MinkowskiDistance(x,y)=0

In some embodiments, when x=y, the distance measure between x and y may not yield zero, but will yield a minimal-possible value for a Minkowski distance.

In some embodiments, the minimum possible partial distance of a case point x and any other case point in the database, y, as x pMin(x):

$$pMin(x) = \sum_{i=0}^{m} |x_i - ClosestNonEqualValueTox_i|^p$$

where ClosestNonEqualValueTox$_i$ is the closest value for feature i that is not equal to x$_i$.

In some embodiments, pMin for data element x is calculated by determining for each feature bucket "b", the MaxValue(b)=maximum value contained in b, and the MinValue(b)=min value contained in b. For the feature bucket that x's i$^{th}$ feature value maps to; b$_{xi}$, and right neighbor bucket b$_{xi+1}$ and left neighbor bucket b$_{xi-1}$, $$pMin(x) = \sum_{i=0}^{m} (\min(|x_i - MaxValue(b_{x_i-1})|, |x_i - MinValue(b_{x_i+1})|))^p$$

In some embodiments, this equation holds for all data elements y!=x in the database or model, and therefore may be constant with respect to y (just as pMax(x) may be). In some embodiments, pMin and pMax are updated when inserting or deleting from the database or model.

Given a specific y, MinkowskiDistance(x, y) can be bounded as:

MinkowskiDistance(x,y)≥pMin(x), if x=y, then MinkowskiDistance(x,y)=0

So:

MinkowskiDistance(x,y)≥pMin(x), and

MinkowskiDistance(x,y)≤pMax(x), if x=y, then MinkowskiDistance(x,y)=0

In some embodiments, the techniques include determining the partial distance, which may be a partial, or possibly incomplete, solution to the Minkowski distance equation (presented elsewhere herein), where x and y are data elements (e.g., vectors) within the semi-metric space.

In some embodiments, given a set of feature indices, PartialDistance can be calculated as:

$$PartialDistance(x, y, \text{indices}) = \sum_{i \text{ in indices}} |x_i - y_i|^p$$

where "indices" include feature indices and |x−y|$^p$ may be the feature delta, and the MinkowskiDistance may be the summation of the PartialDistances plus the uncalculated feature deltas. As such:

$$MinkowskiDistance(x, y, \text{indices}) = \left( \sum_{i \text{ not in indices}} |x_i - y_i|^p + PartialDistance(x, y, \text{indices}) \right)^{\frac{1}{p}}$$

where the indices may be a set of features that have not been filled in during the pSum step. For example, in some embodiments, PartialDistance(x, y, indices)+pSum(x, y)=Distance(x, y).

Examples of Improved Distance Bounds for Specific Datapoints

In some embodiments, the techniques include determining refined inequality bounds of the Minkowski Distance formula. For example, given $$MinkowskiDistance(x, y, Sp) = \left(Sp.sum + \sum_{i=0}^{m,\ i\ not\ in\ Sp.indices} |x_i - y_i|^p\right)^{\frac{1}{p}}$$

Where Sp is the partial sum, Sp.sum and Sp.indices are defined elsewhere herein, and $$\sum_{i=0}^{m,\ i\ not\ in\ Sp.indices} |x_i - y_i|^{p^{1/p}} \geq 0$$

then

MinkowskiDistance(x,y,Sp)≥Sp.sum

In some embodiments, we define pMin (e.g., the summation of all the individual minimum feature deltas to the value we are searching) and pMax (e.g., the summation of all the individual maximum feature deltas to the value we're searching) to use sets of indices:

$$Pmin(x, indices) = \sum_{i=0}^{m,i\ in\ indices} \left(\min(|x_i - MaxValue(b_{x_i-1})|,\ |x_i - MinValue(b_{x_i+1})|)\right)^{p}$$

$$Pmax(x, indices) = \sum_{i=0}^{m,i\ in\ indices} \max(|x_i - fMax_i|,\ |x_i - fMin_i|)^{p}$$

This may define a tightly-bounded inequality as:

MinkowskiDistance(x,y,Sp)≥Sp.sum+pMin(x,Sp.indices$^c$)

and

MinkowskiDistance(x,y,Sp)≤Sp.sum+pMax(x,Sp.indices$^c$)

where SP.indices$^c$ is the complement of indices in Sp.indices (e.g., the features that are already filled in).

Additional Embodiments of Search Algorithms

In some embodiments, the techniques include comparing fMax and fMin (discussed elsewhere herein) once before any search. The values of fMax and fMin may be static for any search.

Consider a search for x (e.g., an input data element). The search may also include PSearchRange, which may be a set of per-dimensional projection search ranges, defaulting to 0 (no range, exact value only); specified by the user, automatically, or algorithmically. In some embodiments, the use of 0 (zero) may increase speed for this single step in the algorithm (e.g., resulting in less to search/compute in a Sweep Tree or other structure lookup). In some embodiments, the use of 0 may also indicate that the list of ANN cases will be smaller and the partial sums will be more incomplete/empty. Using a value other than zero may have the opposite effect. For example, in some embodiments, searching for ALL the range, all of the partial sums would be determined and distance would be computed for every element in the database.

In some embodiments, the technique may proceed by
1) Computing pMin(x) and pMax(x) using fMin and fMax as discussed elsewhere herein
2) Accumulate Partial Distance bases:
   a) For each dimension (feature) i of data element x:
      i) For all cases (data elements) 'y' within PSearchRange[i], where PSerchRange is the PSearchRange for feature i.
         (1) Accumulate the Partial Distance Sp for each y
            (a) Sp(x, y).sum+=|x$_i$−y$_i$|$^p$
            (b) Sp(x, y).indices |=i
         (2) Add y to set 'S'
3) Computing K likely-nearest neighbors by selecting the most common cases to x from S:
   a) While not K cases checked:
      i) Find case from S with highest number of shared buckets (aka "most common features with x"), where, as described elsewhere herein, sharing a bucket may mean that the feature values match (e.g., when a bucket contains only a single value), or that the features all hash to the same bucket (e.g., when the bucket contains multiple values). Alternatively, compute pMax(x, y) and find cases with lowest pMax(x, y)
      ii) If none exist (S is empty), pick a case (e.g., at random among cases in model or database)
      iii) Compute distance from x to case, store <case, distance> into heap as a nearest neighbor
      iv) Store into sorted heap 'A', where sorted heap A, in some embodiments, is the heap/sorted structure holding the final output results. For example, when the nearest neighbor results are found in the correct order (least to greatest, or vice versa), the embodiment may include inserting them into a heap as they are found so they are in correct sorted output for return. In some embodiments, this step may be skipped if putting the results in sorted order is not needed. Nevertheless, such embodiments may need to determine the kth largest neighbor in order to iteratively shrink the window query bounds.
4) Pruning candidates from hypothetical likely-nearest neighbor best distance:
   a) In some embodiments, when sorted heap A contains k cases, no other cases exist in the set of KNN for x unless they have a distance to x less than the kth highest distance to x from any case in A, defined as kMax. Then the techniques include finding all cases that have a distance to x less than the kth highest distance to x from any case in A. Further, the distance possibilities, or ranges, that each case can possibly have with respect to x are determined. So, if the lowest possible distance from x to a case is greater than the kth highest distance to x from any case in A, then it cannot be in the KNNs of x.
   b) For each case in A
      i) Computing pMin(x,y)
      ii) If pMin(x,y)>kMax
         continue to next case in A
         1. Else,
            a. Computing pMax(x,y)
            b. If pMax(x,y)<kMax,
               i. y should definitely be in A
               Else
               ii. y could possibly be in A in some embodiments, if using KNN, y is considered as a possibility regardless and continue below else, if using approximate NN, reject y if pMax(x,y)

>Approximate multiplier*kMax, where Approximate multiplier is a user-generated constant or function to control the accuracy vs performance ratio of the algorithm. See discussion elsewhere herein on Approximate multiplier.
    if considering y, then
    compute MinkowskiDistance(x,y,Sp)
   iii. If MinkowskiDistance(x,y,Sp)≤kMax
      Insert y into heap A, ejecting the current-largest distance element of A
      Else
      Skip y, continue to next case in A because, in some embodiments, y cannot possibly be closer to x than any case in A.
5) Return heap A (e.g., with each distance raised to the 1/p as discussed elsewhere herein) as the KNN or ANN of x.

In some embodiments, an approximate multiplier, approximate_multiplier is used. This multiplier may be 1 (or higher), with high (e.g., possibly 100%) accuracy. If the multiplier is lower than 1, and the closer it gets to 0, the higher performance of the overall algorithm at the possible expense of result accuracy.

In some embodiments, the algorithmic complexity for search in a dataset of m dimensions (features) for n cases may be for the precompute of fMax and fMin of O(1). As noted elsewhere herein, fMin and fMax may be precomputed once as O(a) prior to searching, and may be cached. In some embodiments, as discussed elsewhere herein, there may be a precompute O(m) step required before Searches can be conducted in the first place.

In some embodiments, accumulating the partial distances may be O(Distribution(m, n)), effectively sub-logarithmic to constant for a growing distribution, logarithmic for a fixed parameter data distribution. Computing the k nearest neighbors may be performed in O(Distribution(m, n)/2) time. Pruning may be performed in O(Distribution(m, n)) time. Overall, in some embodiments, the compute complexity bound for the feature-bucketed data structure, such as a SBFDS, search may be at best constant time O(1) and at worst logarithmic O(m*log(n)).

Example Embodiments, Virus Mutation Data

Figure 6:
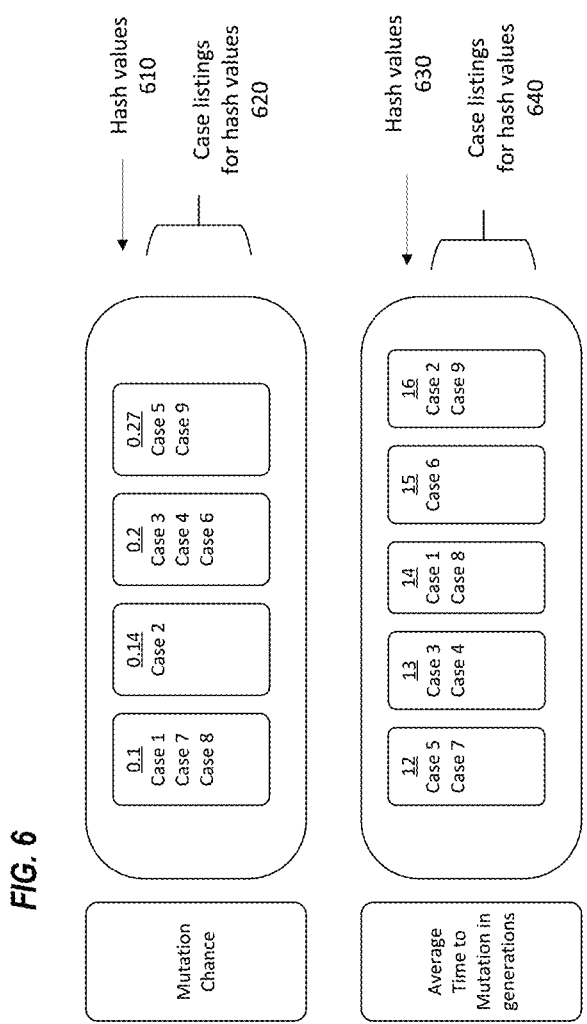
FIG. 6 is a block diagram depicting an example for improved searching and querying in computer-based reasoning systems.

In the example of FIG. 6, there may be virus mutation data for 9 breeds of a virus. There are two features, Mutation Chance (with hash values 610) and Average Time to Mutation in Generations (with hash values 630). The cases for each hash value 610, 630 may be represented with reference identifiers, such as case listings 620 and 640, respectively.

In order to accomplish a search for the three nearest neighbors of Case 1:

First, the techniques may compute the fMin (e.g., minimum distances between two known feature values) and fMax (e.g., maximum distance between two known feature values) for both features:

$f$Min[0]=0.1−0.14=0.04

$f$Min[1]=14−13,14−15, etc.=1

$f$Max[0]=0.1−0.27=0.17

$f$Max[1]=14−12,14−16, etc.=2

Next, the techniques may find the trivial set of cases that share a feature bucket with Case 1:

{7, 8} for hash value 610 and {8} for hash value 630→{7, 8, 8}→{7, 8}

Note that this set only contains 2 cases, and 3 nearest neighbors have been requested (k=3). The techniques may therefore expand the search to include neighboring feature buckets:
   {7, 8}, the original cases as well as neighbor {2} for the hash value 610, and neighbors {3, 4} and {6} for the hash value 630→{7, 8, 2, 3, 4, 6}

The techniques may then compute the partial distances Sp:

$Sp$(case 1, case 7)=0 with indices {0}

$Sp$(case 1, case 8)=0 with indices {0,1}

$Sp$(case 1, case 2)=0.04 with indices {0}

$Sp$(case 1, case 3)=1 with indices {1}

$Sp$(case 1, case 4)=1 with indices {1}

$Sp$(case 1, case 6)=1 with indices {1}

Next, the techniques, in some embodiments, may select K likely best neighbors from the above set, by also first computing their pMax:

$p$Max($x,y$)=pSum($x,y$).sum+sum(over all indices $i$ not in pSum.indices)($f$Max[$i$])

$p$Max(case 1, case 7)=(0)+(2)=2.0

$p$Max(case 1, case 8)=(0)+(0)=0.0

$p$Max(case 1, case 2)=(0.04)+(2)=2.04

$p$Max(case 1, case 3)=(0.17)+(1)=1.17

$p$Max(case 1, case 4)=(0.17)+(1)=1.17

$p$Max(case 1, case 6)=(0.17)+(1)=1.17

There may now be 4 cases {8, 3, 4, 6} with distances that are, at the most, 1.17 from case 1, so kMax may be initialized as:

$k$Max=1.17

Any other cases cannot have a distance less than kMax and cannot be in the KNN of case 1 because there are at least K cases with distance less than or equal to kMax.

In some embodiments, the techniques proceed by refining kMax to further shrink the search window by computing the complete Minkowski distance of each of the 4 cases from above, and update kMax accordingly:

$$MinkowskiDistance(x, y, Sp) = Sp.\text{sum} + \sum_{i=0}^{m,\ i\ not\ in\ Sp.indices} |x_i - y_i|^p{}^{\frac{1}{p}}$$

MinkowskiDistance(case 1, case 8)=(0.0)+(0.0)=0.0

MinkowskiDistance(case 1, case 3)=(1)+(0.1)=1.1

MinkowskiDistance(case 1, case 4)=(1)+(0.1)=1.1

MinkowskiDistance(case 1, case 6)=(1)+(0.1)=1.1

This may indicate that kMax must be reduced to kMax=1.1. The techniques may proceed by, for each case not in {8, 3, 4, 6}, comparing its pMin to kMax. In some embodiments, the techniques first compare fMin (which may be fMin the minimum possible distance of any case not in {7, 8, 2, 3, 4, 6}) to kMax.

fMin=1.17>kMax

Since Min is greater than kMax, no case not in {7, 8, 2, 3, 4, 6} can be in the KNN of case 1. If fMin were less than kMax, then, in some embodiments, the techniques would proceed by iterating over the other cases, iteratively refining kMax until all cases are considered or until kMax<fMin. Subsequently, the techniques compare the remaining cases in {7, 8, 2, 3, 4, 6} to finalize the KNN results:

pMin(case 1, case 7)=(0.0)+(1.0)=1.0 pMin(case 1, case 2)=(0.04)+(1.0)=1.04

Since both pMins are below kMax, the techniques cannot reject neither case 7 nor case 2 as KNN results, so, in some embodiments, their Minkowski distances are calculated:

MinkowskiDistance(case 1, case 7)=(0.0)+(2.0)=2.0

MinkowskiDistance(case 1, case 2)=(0.04)+(2.0)= 2.04

Both 2.0 and 2.04 are greater than kMax=1.1, so neither case 7 nor 2 are in the KNN of Case 1.

Finally, the techniques have produced candidate nearest neighbors {case 8=>distance 0.0, case 3=>distance 1.1, case 4=>distance 1.1, case 6=>distance 1.1} and no other cases to have a distance to Case 1 less than or equal to 1.1.

Therefore, the techniques can use the candidate results to determine the k nearest neighbors. For example, in some embodiments, since there are 4 results due to a value tie, the techniques can omit any of cases {3, 4, 6} (which are all the same distance from Case 1) or just return 4 cases as the result.

Example Embodiment, Including Numeric Examples

Consider an example embodiment, where

F is a number of features, a bucket is a tuple of: feature value and corresponding list of case indices that have this value for this feature sweepTree=list of ordered buckets for a feature feature-bucketed data structure, such as a SBFDS, (also referred to as a multiSweepTree)=F sweepTrees The hyperparameters of K (the number of nearest neighbors searched for), and P (the Minkowski order) may be set to K=3, P=2, and the dataset may have three features: x, y, z. A dataset of 12 points (with idx as the index of each row/case—and the data having been received and stored using 110-140 as one example) may be expressed as follows:

| idx | x | y | z |
|---|---|---|---|
| 0 | 29 | 140 | 42 |
| 1 | 22 | 142 | 50 |
| 2 | 21 | 142 | 40 |
| 3 | 22 | 140 | 43 |
| 4 | 22 | 143 | 51 |
| 5 | 33 | 112 | 21 |
| 6 | 32 | 112 | 60 |
| 7 | 31 | 113 | 22 |
| 8 | 29 | 113 | 23 |
| 9 | 34 | 112 | 61 |
| 10 | 37 | 115 | 32 |
| 11 | 34 | 115 | 31 |

In some embodiments, the techniques may execute on the feature-bucketed data structure, such as a SBFDS, for this dataset as follows: Each feature is treated as a sweepTree of buckets (see, e.g., FIG. 5 and related discussion) and may be expressed as value[case indices] as indicated in the following table:

| x | y | z |
|---|---|---|
| 21[2] | 112[5, 6, 9] | 21[5] |
| 22[1, 3, 4] | 113[7, 8] | 22[7] |
| 29[0, 8] | 115[10, 11] | 23[8] |
| 31[7] | 140[0, 3] | 31[11] |
| 32[6] | 142[1, 2] | 32[10] |
| 33[5] | 143[4] | 40[2] |
| 34[9, 11] |  | 42[0] |
| 37[10] |  | 43[3] |
|  |  | 50[1] |
|  |  | 51[4] |
|  |  | 60[6] |
|  |  | 61[9] |

In some embodiments, using the sweepTree, for each feature value, the techniques can determine the ids of cases that share that value. By looking up the indices associated with the feature value. For example, a feature value of 115 for feature y, would indicate that cases 10 and 11 have value 115 for feature y.

In some embodiments, in order to generate min and max feature bounds by storing the first and last values for each feature sweepTree. Returning to the numeric example, this may be expressed as:

feature_bounds={
'x': {'min': 21, 'max': 37}
'y': {'min': 112, 'max': 143},
'z'{'min': 21, 'max': 61}
}

To continue the example, consider a query (e.g., received as part of receiving 150 of FIG. 1) for K=3 closest values for the input vector of 28, 140, 28 (x=28, y=140, z=28). The techniques may first, optionally (and optionally part of determining 160), accumulate initial list of candidate cases with similar feature values, For each feature find closest bucket for the value:

x: 29[0,8] //closest bucket to X=28, binary search O(log (size x))
y: 140[0,3] //exact match on Y=140, O(1) lookup
z: 31[11] //closest bucket to Z=28, binary search O(log (size z))

This list of candidates may be stored as list of initial candidate cases from the closest buckets:

list of candidates=[0,3,8,11]

where list_of_candidates may be a heuristic for the potential k_cases. This initial list_of_candidates may or may not contain the closest k cases, but may nevertheless serve as a starting point in embodiments that make such a list. In some embodiments, the list_of_candidates may be set in other ways, such as a set of randomly-selected cases, set based on a cache of cases selected for a similar search, set based on cases that are most selected in previous list_of_candidates, based on closeness on less than the complete set of features (e.g., only those cases that are close to the first two features x, y, or just feature x), and/or the like.

Some embodiments proceed by storing the feature deltas for the list_of_candidates (e.g., as part of determining 160 and/or determining 170). Feature deltas may be calculated as the difference between the candidate case and the search vector (on a per-feature basis). In some embodiments, "null" or "NaN" or other indication may be used where the delta has not been calculated.

| id | x    | y    | z    | rejected | calculated_dist |
|----|------|------|------|----------|-----------------|
| 0  | 1    | 0    | null | false    | null            |
| 1  | null | null | null | false    | null            |
| 2  | null | null | null | false    | null            |
| 3  | null | 0    | null | false    | null            |
| 4  | null | null | null | false    | null            |
| 5  | null | null | null | false    | null            |
| 6  | null | null | null | false    | null            |
| 7  | null | null | null | false    | null            |
| 8  | 1    | null | null | false    | null            |
| 9  | null | null | null | false    | null            |
| 10 | null | null | null | false    | null            |
| 11 | null | null | 9    | false    | null            |

In some embodiments, optionally, the techniques may proceed by calculating (e.g., as part of determining 160 and/or determining 170) the min (smallest gap) and max (largest gap) possible distance for each feature to the corresponding feature in the search query. To find smallest gap, for searched-for values that have a corresponding bucket in the sweepTree (e.g., returning to the example, that would be just feature y, where the searched-for value y=140 corresponds to a bucket in the sweepTree), take the smaller difference from the searched-for values to the values in the two adjacent buckets, otherwise if the value isn't in the sweepTree, just take the difference to the value in the closest bucket. As a more specific example:

For x, 28 doesn't have a matching bucket in the sweep-Tree. The closest bucket is 29, with a difference of 1. 1^2 is 1, so the min gap is 1 for feature X.

For Y, our searched-for value 140 has a matching bucket. Now look at adjacent buckets 115 and 142. The difference from 140 to these values is . . . 25 and 2. 2 is the smallest. 2 Squared (because we're using p=2) is 4. Giving us a minimum gap of 4 for feature Y.

For Z, our searched-for value is 28, the closest bucket is 31–that gives a difference of 3—and a min gap of 9.

In some embodiments, to find largest gap, the techniques take the larger difference between the searched-for value and the feature min/max bounds (using the feature_bounds lookup above):

For X, using the searched-for value of 28 and the feature bound min/max of 21, 37 we have differences of 7, 9. 9 is largest, to the power 2 (the p value), gives us a max gap of 81.

Stated differently, squaring all the differences because we're using P=2:

$$x\_min\_gap=|28-29|=1^{\wedge}=1$$

$$x\_max\_gap=\max(|28-21|,|28-37|)=9^{\wedge}=81$$

$$y\_min\_gap=\min(|140-115|,|140-142|)=2^{\wedge}=4$$

$$y\_max\_gap=\max(|140-112|,|140-143|)=28^{\wedge}=784$$

$$z\_min\_gap=|28-31|=3^{\wedge}=9$$

$$z\_max\_gap=\max(|28-21|,|28-61|)=33^{\wedge}=1089$$

In some embodiments, the min_gap may represent, if there were just one feature given a new case, with a known feature value, the smallest distance it could be to an existing case while assuming nothing about the other features. For example, if we know the searched-for value of X is 28, the best possible feature distance (best_possible_feature_dist) =min(x_min_gap, y_min_gap, z_min_gap)=1, where the best_possible_feature_dist is the smallest of the feature min gaps. In this case 1, as that is the X min gap (and is smaller than 4 and 9).

For a given feature, the 'feature delta' may be the distance to the searched-for value for that feature. For Z, the feature delta for a case (with respect to a searched-for value) may be the difference between value of the feature for a case and the searched-for value for that feature, squared. For example, for data element 10 feature Z is 32 and z, the searched-for value, is 28. The feature delta is 4, which when squared is 16.

In some embodiments, the list of candidate cases is pruned (e.g., as part of determining 160 and/or determining 170). Pruning the candidate cases may proceed by iterating over all cases to determine whether they already have any feature deltas calculated (in the feature_delta_store). For example, in some embodiments, all the cases is the current list_of_candidates will have at least one feature delta calculated because of the initial calculation finding closest bucket for value. As the techniques iterate, any case that has less than half feature deltas calculated (in the feature_delta_store) may be removed (if it exists) from the list_of_candidates. In the numeric example, data elements 3, 8, and 11 are removed (because they have only one feature delta calculated) and only data element 0 remains. One way to represent this is that list_of_candidates=[0]. In some embodiments, if there are less than K cases in list_of_candidates, the techniques may randomly selected cases from the dataset to include in the list of candidate cases to increase the number to K total cases. In the numeric example, K=3, so the technique will randomly pick 2. As an example, it may randomly select 7 and 10. As an example:

list_of_candidates=[0,7,10]

closest_cases=[ ] #priority queue of the $k$ closest

Some embodiments proceed by calculating the full non-exponentiated Minkowski distances to each case in list_of_candidates (for example, the techniques may use values in feature_delta_store that where not null and/or where feature deltas were already calculated during initial closest bucket search above. The techniques may proceed by summing the squares (where p=2), but the techniques may optionally not calculate the root, when the order of distances is monotonic regardless of exponentiation. For example, Data element 0: 1+0+|28-42|^2=197

Data element 7: |28-31|^+|140-113|^2+|28-22|^=774

Data element 10: |28-37|^2+|140-115|^+|28-32|^^=657 closest_cases=[0,10,7] #Fill up queue where priority is distance farthest_candidate_distance=774

In some embodiments, the techniques may (e.g., as part of determining 160 and/or determining 170) proceed by iterating over all cases and reject any under the following conditions:

Skip data element if case in closest_cases

For other data elements:

Consider whether replacing the uncalculated feature deltas for each data element (in the feature_delta_store) with the best_possible_feature_dist would still be worse than the farthest_candidate_distance. For example, consider data element 1: null, null, null
  Replace nulls with best_possible_feature_dist (1) to result in:
  1,1,1
  and 1+1+1=3, 3<774
  Since the sum is less data element 1 cannot be rejected
Consider whether replacing the uncalculated feature deltas for each data element with the corresponding feature max_gaps would result in a hypothetical sum is better than the farthest_candidate_distance. Where that is true, the technique calculates the full distance and places it into closest_cases. For example, for data element 1: null, null, null
  Data element 1: 81, 784, 1089
  81+784+1089=1954, if 1954<774, we would put this in the closest_cases list since it has to be closer than the farthest case in closest_cases, and when we calculate actual feature deltas, then it will be at least as good. If so, then we would calculate the actual values.
  In some embodiments, this step can be particularly useful for datasets that have nominal (categorical) features (this example does not) in order to reject them quickly.

Based on the above, in some embodiments, the feature_delta_store would be updated with calculated_dist each time you've calculated the full non-exponentiated distance (for all features). In some embodiments, this may be advantageous when many cases are marked as rejected, which may result when a good initial closest_cases candidates are determined, which may define a maximum furthest candidate distance.

The techniques may then proceed by iterating over all the cases, skipping cases in closest_cases, as well as any rejected cases, and keeping only the closest matches. Further, the techniques may skip (and optionally mark as rejected) any cases where the summation of feature deltas exceeds farthest_candidate_distance.

In some embodiments, the techniques proceed by calculating the distance for data elements that are not already in the feature_delta_store. In some embodiments, feature distances may be calculated in any order, such as random order, in order of original presentation, and/or in order of range for the feature, such as by the standard deviation, entropy, etc. Considering the numeric example, and sorting by feature range:

x_range=feature_bounds[x][max]−feature_bounds[x][min]=16 y_range=feature_bounds[y][max]−feature_bounds[y][min]=31 z_range=feature_bounds[z][max]−feature_bounds[z][min]=40 resulting in an order of feature delta calculations for this dataset as z (largest range of 40), y, x (smallest range of 16).

In some embodiments, the techniques proceed by calculating (e.g., as part of determining 160 and/or determining 170) the distances not already in data_store for each data element, and updating closest_cases as needed. Returning to the numeric example, this may result in:

Data element 0: is in closest_cases and already calculated (in cache), skip
Data element 1: $|28-50|^2+|140-142|^2+|28-22|^2=524$
  524 is less than farthest_candidate_distance of 774, so we update farthest_candidate_distance and insert case 1 into closest_cases (and get rid of farthest):
  closest_cases=[0, 1, 10]
  farthest_candidate_distance=657 (the distance to farthest case, case 10, in closest_cases)
Data element 2: $|28-40|^2+|140-142|^2+|28-21|^2=197$
  197 is less than farthest_candidate_distance of 657, so we update farthest_candidate_distance and insert case 2 into closest_cases (and get rid of farthest):
  closest_cases=[2, 0, 1]
  farthest_candidate_distance=524 (the distance to farthest case, case 1)
Data element 3: $|28-22|^2+0+|28-43|^2=261$
  The feature delta for y, 0, was already calculated before, and 261 is less than farthest_candidate_distance of 524, insert 3 into closest_cases (and get rid of farthest):
  closest_cases=[2,0,3]
  farthest_candidate_distance=261 (the distance to farthest case, case 3)
Data element 4: $|28-51|^2=529$, already bigger than farthest_candidate_distance, skip
Data element 5: $|28-21|^2+|140-112|^2=833$, already bigger than farthest_candidate_distance, skip
Data element 6: $|28-60|^2=1024$, already bigger than farthest_candidate_distance, skip
Data element 7: already calculated, skip
Data element 8: $|28-23|^2+|140-113|^2=754$ skip
Data element 9: $|28-61|^2=1089$, skip
Data element 10: already calculated, skip
Data element 11: $9+|140-115|^2=234$, skip (feature delta for z, 9, was calculated before already)

The techniques may then return (e.g., as part of returning the cases in response to the query (not depicted in FIG. 1)) the closest_cases: [2,0,3]. These closest cases may be returned in response to the received 150 query.

Example Processes for Improved Searching and Querying in Computer-Based Reasoning Systems FIG. 1 is a flow diagram depicting example processes for improved searching and querying in computer-based reasoning systems. Process 100 proceed by receiving 110 new data elements or data elements to incorporate into the data model, database, etc. The data elements may each be multidimensional. Further, each data element may share some or all of its features with other data elements. For each feature in the data element, a feature bucket for the value of the feature in the data element is determined 120 (as discussed elsewhere herein), and a reference (sometimes called a "value" or "ID") for the data element is stored 130 in the feature bucket. This process may be repeated for each feature in each new data element. Further, as discussed elsewhere herein, the feature buckets may optionally be revised 135, from time to time and under certain conditions. Data elements can be added at any time, and at some time the database or data model in which all of the data elements are stored may be made available 140 for searching. Even after making the data model available 140 for searching, new data elements may still be received 110 and included in the database or data model.

In some embodiments, process 100 may include receiving 150 a search query. The search query may include values for features (e.g., all or a subset of possible features), and possibly may include desired precision and/or ranges associated with each feature. The query may be for the closest match (k=1), k nearest neighbors where k>1, etc. As discussed elsewhere herein, the input data element (e.g., the search query) may be used to determine 160 what data elements in the model share (or are near) one or more features or feature buckets with the input data element or search query. These shared buckets may be used to rank 170 a set of candidate data elements, and the nearest neighbor data elements may be determined 180 based at least in part on those rankings.

A desired action or output value can be determined using the k nearest neighbors. For example, if the data elements have an action associated therewith, then the outcome or prediction action can be determined based on the actions in the k nearest neighbors. This prediction or outcome action can then be used to cause 199 control of a controllable system, as discussed extensively elsewhere herein for numerous types of controllable systems (autonomous vehicles, image labeling data, laboratory control, health care decision making, manufacturing data, smart home data, and the like).

Many of the embodiments herein discuss performing a kNN search based on an input data element. In some embodiments, the input data element is equivalent to a search query, such as a structure query in structured query language ("SQL") or other search query language or format. For example, the search query may search for data elements with (or closest to) features (feature1=$f_1$, feature2=$f_2$, etc.). The result may be restricted to those data elements that specifically meet the criteria (e.g., only return data elements with $f_1$, $f_2$, etc.) or may be those that are closest (which would expand the search to those closest to the input features).

Returning to the top of process 100, the techniques may begin by receiving 110 data to store. Receiving the data to store may take any appropriate form, including receiving the data via an application program interface; via FTP, FTPS, HTTP, HTTPS, or other protocol; a remote procedure call, an API, a function or procedure call, by accessing the data on a file server, database, or other storage mechanism (e.g., such as storage 230 or 240 of FIG. 2); and/or the like. The request can be formatted in any appropriate way, including in a structured format, such as HTML, XML, or a proprietary format, or in a format acceptable by the API, remote procedure call, or function or procedure call. As one example, the request may be received 110 over network 290 by a training and analysis system 210 in the manner discussed above.

After receiving 110 the data to store, the buckets in which to store the case for feature value(s) will be determined 120. For example, a data element may have one or more features, and a bucket in which to store the case may be determined for each (or a subset) of the features of the case. In some embodiments, the case will be stored in a bucket for each feature in the case. The data element and may have features all of the known features for such data elements, a subset of known features, and/or new features that had not been seen for data elements previously. The bucket in which to store each of the one or more feature(s) may be determined. For example, in some embodiments, a hash, such as a strictly-ordered linear hash may be determined 120 for a feature value. The hash value may be used to determine the bucket in which to place the case for that feature. For example, in some embodiments, a bucket includes cases for a particular hash value or range of hash values. Hashes and determining hashes are discussed extensively elsewhere herein.

Once the hash value is determined, the data element is stored 130 in the bucket. In some embodiments, storing a data element in a bucket comprises storing a reference, link, or pointer to the data element in the bucket. For example, a particular data element may be stored in a storage, such as storage 230 or 240 of FIG. 2, and the particular data element may have a unique identifier therewith associated. That unique identifier may be stored in the bucket. Turning to FIG. 6 as an example, the buckets for case 1 for the mutation chance feature value may be hashed 120 to 0.1 and the average time to mutation feature value may be hashed 120 to 14 and a reference to case 1 may therefore be stored 130 in bucket 0.1 for the mutation chance feature and bucket 14 for the average time feature. Optionally, after storing 130 the reference to the data element in the appropriate bucket(s), one or more of the buckets may be revise (e.g., grown or shrunk), as discussed in detail elsewhere herein.

Optionally, after storing 130 the reference to the data element in the appropriate bucket(s), more data can be received 110 for storage and/or the current data may be made available 140 for searching. In some embodiments, making the data available for searching may include storing the data in a separate database or storage system, making the hash tables accessible by a search algorithm or the like. In some embodiments, as references to the data elements are stored 130, they are available for searching, thereby making step 140 unnecessary.

Search queries on the stored data are received 150. The search query may be received in any appropriate form, including receiving the data via an application program interface; via FTP, FTPS, HTTP, HTTPS, or other protocol; a remote procedure call, an API, a function or procedure call, by accessing the data on a file server, database, or other storage mechanism (e.g., such as storage 230 or 240 of FIG. 2); and/or the like. The search can be formatted in any appropriate way, including in a structured format, such as SQL, HTML, XML, or a proprietary format, or in a format acceptable by the API, remote procedure call, or function or procedure call. As one example, the search query may be received 150 over network 290 by a training and analysis system 210 and/or a control system 220 in the manner discussed above.

After the search query is received 150, the buckets associated with the search query may be determined 160. For example, the search query may have one or more search terms associated with one or more features, and those search terms may be used to determine buckets in which values may be stored. In some embodiments, all of the features of the data elements may be included in the search query. In some embodiments, less than all of the features of the data elements may be included in the search query. In some embodiments, the search query is for nearest neighbors of a particular data element, and the search query comprises the feature values of the subject data element. The search is then for the nearest neighbors based on the values included in the search query. In some embodiments, the search query has, in addition or instead of a nearest neighbors request, conditions. For example, the search query may include a request for cases that match specific search criteria and those search criteria may be written as an SQL query. One example of such a query would be for the nearest neighbors where, feature A has a value of a1, feature B has a value of b1, feature C is in the range c1-c2, where additional features D . . . Z may be blank.

After feature buckets for the search query have been determined 160, the candidate results may be determined and ranked 170 and the results of the search may be determined 180 based on the ranked results. Numerous embodiments of ranking 170 the candidate results are discussed extensively herein. For example, data elements that share feature buckets with the input data element (the search query) may be considered candidate data elements for a k nearest neighbors search. In some embodiments, the greater the number of shared feature buckets, the "closer" the data element may be to the input data element or search query. If the query is for K nearest neighbors and at least K data elements share the same number of buckets with the input, then all of those cases may be considered candidate data elements, and ranking 170 those at least K cases may include ranking 170 K of those cases as, essentially, tied for the top rank.

Determining 180 the results to return for the search query may include, in various embodiments, the K highest ranked candidate cases. In some embodiments, when there are more than K cases that could be tied for the top rank, other "tie breaking" techniques can be used to determined 180 what results to return. For example, K cases may be selected at random from the more than K cases, the K cases with the highest (or lowest) conviction may be chosen, the newest or oldest K cases may be chosen, the K most complete (in terms of having feature values) cases may be chosen, and/or the like. Numerous other examples and possibilities of determining and ranking 170 the cases are discussed extensively elsewhere herein.

In some embodiments, as discussed extensively herein, optionally, the results of the search may be used to cause 199 control of a controllable systems. Various embodiments of causing 199 control of a controllable systems are discussed herein and include, controlling an autonomous vehicle, manufacturing equipment, smart home devices, image labeling systems, medical decision making systems, etc.

As indicated by the dashed lines from determining 180 and causing 199 control back to receiving 150 a search query, the techniques may continue to receive and determine results for search queries.

Overview of Surprisal, Entropy, and Divergence

Below is a brief summary of some concepts discussed herein. It will be appreciated that there are numerous ways to compute the concepts below, and that other, similar mathematical concepts can be used with the techniques discussed herein.

Entropy ("H(x)") is a measure of the average expected value of information from an event and is often calculated as the sum over observations of the probability of each observation multiple by the negative log of the probability of the observation.

$$H(x) = -\Sigma i p(xi) * \log p(x_i)$$

Entropy is generally considered a measure of disorder. Therefore, higher values of entropy represent less regularly ordered information, with random noise having high entropy, and lower values of entropy represent more ordered information, with a long sequence of zeros having low entropy. If log 2 is used, then entropy may be seen as representing the theoretical lower bound on the number of bits needed to represent the information in a set of observations. Entropy can also be seen as how much a new observation distorts a combined probability density or mass function of the observed space. Consider, for example, a universe of observations where there is a certain probability that each of A, B, or C occurs, and a probability that something other than A, B, or C occurs.

Surprisal ("I(x)") is a measure of how much information is provided by a new event xi.

$$I(x_i) = -\log p(x_i)$$

Surprisal is generally a measure of surprise (or new information) generated by an event. The smaller the probability of X, the higher the surprisal.

Kullback-Leibler Divergence ("KL divergence" or "$Div_{KL}(x)$") is a measure of difference in information between two sets of observation. It is often represented as $Div_{KL}(x) = \Sigma i p(x_i) * (\log p(x_i) - \log q(x_i))$, where $p(x_i)$ is the probability of $x_i$ after $x_i$ has occurred, and $q(x_i)$ is the probability of $x_i$ before $x_i$ has occurred.

Conviction Ratios Examples

In some embodiments, the relative surprisal or conviction within certain scopes, and in comparison to other scopes, can be determined. For example, a feature may have high conviction locally (within the near N neighboring cases, as measured by a distance measure such as those described herein), and lower conviction elsewhere, or vice versa. In the former, the feature would be considered locally stable and globally noisy. In the latter, the opposite would hold and it would be locally noisy and globally stable.

Many possible scopes for conviction determination could be used and compared. A few are presented here, and others may also be used. In some embodiments, each scope compared may be a function of the distance from a case. For example, as discussed elsewhere herein a region may be determined. The region may include the N most similar cases to the case in question, the most similar P percent (as compared to the entire model), the cases within distance D, or the cases within a local density distribution, as discussed elsewhere herein. For example, the N most similar cases to the suggested case (or to the input context) may be determined based on a distance measure, such as those described herein. The number N may be a constant, either globally or locally specified, or a relative number, such as a percentage of the total model size. Further, the cases in the region may also be determined based on density. For example, as discussed elsewhere herein, if the cases around the case of interest meet a particular density threshold, those most similar cases could be included in the regional set of cases (and cases not meeting those density thresholds could be excluded). Further, in some embodiments, the similarity (or distance) may be measured based on the context only, the action only, or the context and the action. In some embodiments, only a subset of the context and/or action is used to determine similarity (or distance).

The following are some example measures that may be determined:

W: Conviction of feature in the whole model;
    X: Conviction of a feature outside the regional model;
    Y: Conviction of a feature inside the regional model;
    Z: Conviction of feature for local (k neighbors) model;
    where "local" would typically, but not always, constitute a smaller number of cases than the "regional" model.

As discussed elsewhere herein, conviction can be measured in numerous ways, including excluding a feature from a particular model or portion of a model and measure the conviction as a function the surprisal of putting the feature (or features, or data elements) back in. Conviction measures are discussed extensively herein.

As noted, above, other measures (other than W, X, Y, and Z, listed above) can be used. After two (or more) of the conviction measures are calculated, the ratio of those measures may be determined. For example, in some embodiments, a determined 120 conviction score (ratio) may indicate whether a suggested case or feature of a case is "noisy." The noisiness of a feature can be determined as a conviction score, in some embodiments, by determining local noisiness and/or relative noisiness. In some embodiments, local noisiness can be determined by looking for the minimum of Y (or looking for the number of cases with Y<1). Relative noisiness may be determined based on the ratio of Z to W. As another example, in some embodiments, a high feature conviction ratio between W and Y may indicate that the feature may be "noisy." The noisiness of the feature may be indicated based on the ratio of W to Y and/or Y to W.

In some embodiments, measure other that W, X, Y, and Z listed above may include measures based on feature importance to a given target, feature importance to the whole model, predictability of a feature with or without confidence bounds, measures of whether features contribute to or detract from accuracy, and/or the like. For example, in some embodiments, the techniques include determining prediction conviction for features based on a conviction of the accuracy of the prediction using residuals. Using such techniques may be beneficial when features that negatively impact accuracy in a region may be considered "noisy" and therefore be useful as a measure to include in a determination of whether to automatically cause 199 performance of a suggested action.

In some embodiments, once the noisiness of a case/feature is determined as a conviction score, a decision can later be made whether to cause 199 performance of the suggested action. For example, if the features (or action) of the suggested case are not noisy (locally and/or regionally, depending on the embodiment), then a system may be confident in performing the suggested action in the suggested case. If, however, the features (or action) of the suggested case are noisy, then that noisiness measure may be provided along with the suggested action. Ise, a human operator may then review the noisiness data and determine whether to perform the suggested action, a different action, or no action at all.

Prediction Conviction Examples

In some embodiments, the conviction score is a prediction conviction of a suggested case. As such, determining the certainty score can be determined as the prediction conviction. In some embodiments, when the prediction conviction is determined to be above a certain threshold, then performance of the suggested action can be caused 199. If the prediction conviction is determined to be below a certain threshold, then the prediction conviction score can be provided along with the suggested cases. A human operator may then review the prediction conviction (and any other explanation data) and determine whether to perform the suggested action, a different action, or no action at all.

Determination of prediction conviction is given below. First, familiarity conviction is discussed. Familiarity conviction is sometimes called simply "conviction" herein. Prediction conviction is also sometimes referred to as simply "conviction" herein. In each instance where conviction is used as the term herein, any of the conviction measures may be used. Further, when familiarity conviction or prediction conviction terms are used, those measure are appropriate, as are the other conviction measures discussed herein.

Feature Prediction Contribution Examples

In some embodiments, feature prediction contribution is determined as a conviction score. Various embodiments of determining feature prediction contribution are given herein. In some embodiments, feature prediction contribution can be used to flag what features are contributing most (or above a threshold amount) to a suggestion. Such information can be useful for either ensuring that certain features are not used for particular decision making and/or ensuring that certain features are used in particular decision making. If the feature prediction contribution of a prohibited feature is determined to be above a certain threshold, then the suggested action along with explanation data for the feature prediction contribution can be provided to a human operator, who may then perform the suggested action, a different action, or no action at all. If the feature prediction contribution for undesirable features are determined to be below a certain threshold, then performance of the suggested action may be caused 199 automatically.

Consider unknown and undesirable bias in a computer-based reasoning model. An example of this would be a decision-making computer-based reasoning model suggesting an action based on a characteristic that it should not, such deciding whether to approve a loan based on the height of an applicant. The designers, user, or other operators of a loan approval system may have flagged height as a prohibited factor for decision making. If it is determined that height was a factor (for example, the feature prediction contribution is above a certain threshold) in a loan decision, that information can be provided to a human operator, who may then decide to perform the suggested action (approve the loan notwithstanding that it was made at least in part based on height), a different action, or no action at all. If the feature prediction contribution of height is below the certain threshold, then the loan may be approved without further review based on the contribution of height to the decision.

As noted above, in some embodiments, there may also be features whose contribution are desired (e.g., credit score in the case of a loan approval). In such cases, if the feature prediction contribution for a feature whose contribution is desired is determined to be below a certain threshold, then the suggested action along with the feature prediction contribution may be provided to a human operator who may then decide to perform the suggested action (approve the loan notwithstanding that it was made at without contribution of the desired feature), a different action, or no action at all. If the feature prediction contribution of the desired feature is below the above threshold, then performance of the action may be caused 199 (e.g., loan may be approved) without further review based on the contribution of the desired feature (e.g., credit score) to the decision.

In some embodiments, not depicted in the figures, the feature contribution is used to reduce the size of a model in a computer-based reasoning system. For example, if a feature does not contribute much to a model, then it may be removed from the model. As a more specific example, the feature prediction contribution may be determined for multiple input contexts (e.g., tens of, hundreds of, thousands of, or more) input contexts and the feature contribution may be determined for each feature for each input context. Those features that never reach an exclusionary threshold amount of contribution to a decision (e.g., as determined by the feature prediction contribution) may be excluded from the computer-based reasoning model. In some embodiments, only those features that reach an inclusion threshold may be included in the computer-based reasoning model. In some embodiments, both an exclusionary lower threshold and inclusionary upper threshold may be used. In other embodiments, average contribution of a feature may be used to rank features and the top N features may be those included in the models. Excluding features from the model may be beneficial in embodiments where the size of the model causes the need for extra storage and/or computing power. In many computer-based reasoning systems, smaller models (e.g., with fewer features being analyzed) may be more efficient to store and when making decision. The reduced models may be used, for example, with any of the techniques described herein.

Familiarity Conviction Examples

Conviction and contribution measures may be used with the techniques herein. In some embodiments, conviction measures may be related in various ways to surprisal, including conviction being related to the ratio of observed surprisal to expected surprisal. Various of the conviction and contribution measures are discussed herein, including familiarity conviction. Familiarity conviction may be useful to employ conviction as measure of how much information the point distorts the model. To do so, the techniques herein may define a feature information measure, such as familiarity conviction, such that a point's weighted distance contribution affects other points' distance contribution and compared to the expected distance contribution of adding any new point.

Definition 1. Given a point $x \in X$ and the set $K$ of its $k$ nearest neighbors, a distance function $d: R^z \times Z \to R$, and a distance exponent $\alpha$, the distance contribution of $x$ may be the harmonic mean $$\phi(x) = \left( \frac{1}{|K|} \sum_{k \in K} \frac{1}{d(x, k)^\alpha} \right)^{-1}. \tag{1}$$

Definition 2. Given a set of points $X \subset R^z$ for every $x \in X$ and an integer $1 \le k < |X|$ one may define the distance contribution probability distribution, $C$ of $X$ to be the set $$C = \left\{ \frac{\phi(x_1)}{\sum_{i=1}^n \phi(x_i)}, \frac{\phi(x_2)}{\sum_{i=1}^n \phi(x_i)}, \ldots, \frac{\phi(x_n)}{\sum_{i=1}^n \phi(x_i)} \right\} \tag{2}$$

for a function $\varphi: X \to R$ that returns the distance contribution.

Note that if $\varphi(0) = \infty$, special consideration may be given to multiple identical points, such as splitting the distance contribution among those points.

Remark 1. $C$ may be a valid probability distribution. In some embodiments, this fact is used to compute the amount of information in $C$.

Definition 3. The point probability of a point $x_i$, $i = 1, 2, \ldots, n$ may be $$l(i) = \frac{\phi(x_i)}{\sum_i \phi(x_i)} \tag{3}$$

where the index i is assigned the probability of the indexed point's distance contribution. One may denote this random variable L.

Remark 2. When points are selected uniformly at random, one may assume L is uniform when the distance probabilities have no trend or correlation.

Definition 4. The conviction of a point $x_i \in X$ may be $$\pi(x_i) = \frac{\frac{1}{|X|} \sum_i \mathbb{KL}(L \| L - \{i\} \cup \mathbb{E}l(i))}{\mathbb{KL}(L \| L - \{x_i\} \cup \mathbb{E}l(i))} \tag{4}$$

where KL is the Kullback-Leibler divergence. In some embodiments, when one assumes L is uniform, one may have that the expected probability $$\mathbb{E}l(i) = \frac{1}{n} \mathbb{E}l(i) = \frac{1}{n}.$$

Prediction Conviction Examples

In some embodiments, the conviction score is prediction conviction, and prediction conviction may be a proxy for accuracy of a prediction. Techniques herein may determine prediction conviction such that a point's weighted distance to other points is of primary importance and can be expressed as the information required to describe the position of the point in question relative to existing points.

Definition 5. Let be the number of features in a model and n the number of observations. One may define the residual function of the training data X:

$$r: X \to R^\xi$$

$$r(x) = J_1(k,p), J_2(k,p), \ldots, J_\xi(k,p) \tag{5}$$

Where $J_i$ may be the residual of the model on feature i parameterized by the hyperparameters k and p evaluated on points near x. In some embodiments, one may refer to the residual function evaluated on all of the model data as $r_M$. in some embodiments, the feature residuals may be calculated as mean absolute error or standard deviation.

In some embodiments, one can quantify the information needed to express a distance contribution $\varphi(x)$ by moving to a probability. In some embodiments, the exponential distribution may be selected to describe the distribution of residuals, as it may be the maximum entropy distribution constrained by the first moment. In some embodiments, a different distribution may be used for the residuals, such as the Laplace, lognormal distribution, Gaussian distribution, normal distribution, etc.

The exponential distribution may be represented or expressed as:

$$\frac{1}{\lambda} = \|r(x)\|_p \tag{6}$$

We can directly compare the distance contribution and p-normed magnitude of the residual. This is because the distance contribution is a locally weighted expected value of the distance from one point to its nearest neighbors, and the residual is an expected distance between a point and the nearest neighbors that are part of the model. Given the entropy maximizing assumption of the exponential distribution of the distances, we can then determine the probability that a distance contribution is greater than or equal to the magnitude of the residual $\|r(x)\|_p$ as:

$$P(\varphi(x) \ge \|r(x)\|_p) = e^{-\frac{1}{\|r(x)\|_p} \cdot \varphi(x)}. \tag{7}$$

We then convert the probability to self-information as:

$$I(x) = -\ln P(\varphi(x) \ge \|r(x)\|_p), \tag{8}$$

which simplifies to:

$$I(x) = \frac{\varphi(x)}{\|r(x)\|_p}. \tag{9}$$

As the distance contribution decreases, or as the residual vector magnitude increases, the less information may be needed to represent this point. One can then compare this to the expected value a regular conviction form, yielding a prediction conviction of:

$$\pi_p = \frac{EI}{I(x)}, \quad (10)$$

where I is the self-information calculated for each point in the model.

Additional Prediction Conviction Examples

In some embodiments, $\varphi(x)$ may be the distance contribution of point x, and r(x) may be the magnitude of the expected feature residuals at point x using the same norm and same topological parameters as the distance contribution, putting both on the same scale.

The probability of both being less than the expected values may be:

$$P(\phi(x) > \mathbb{E}\,\phi(x)) \cdot P(r(x) > \mathbb{E}\,r(x)).$$

The self-information of this, which may be the negative log of the probability $$I = \frac{\phi(x)}{\mathbb{E}\phi(x)} + \frac{r(x)}{\mathbb{E}r(x)}.$$

The prediction conviction $$\pi_p = \frac{\mathbb{E}I}{I}$$

then may be calculated as:
which simplifies to $$\pi_p = \frac{2}{\frac{\phi(x)}{\mathbb{E}\phi(x)} + \frac{r(x)}{\mathbb{E}r(x)}}.$$

Feature Prediction Contribution Examples

In some embodiments, the conviction score determined is feature prediction contribution, which may be related Mean Decrease in Accuracy (MDA). In MDA scores are established for models with all the features M and models with each feature held out $M_{-f_i}$, i=1 ... q. The difference $|M-M_{-f_i}|$ is the importance of each feature, where the result's sign is altered depending on whether the goal is to maximize or minimize score.

In some embodiments, prediction information $\pi_c$ is correlated with accuracy and thus may be used as a surrogate. The expected self-information required to express a feature is given by:

$$EI(M) = \frac{1}{\xi}\sum_{i}^{\xi} I(x_i),$$

and the expected self-information to express a feature without feature i is $$EI(M_{-i}) = \frac{1}{\xi}\sum_{j=0}^{\xi} I_{-i}(x_j).$$

One can now make two definitions:
Definition 6. The prediction contribution $\pi_c$ of feature i is $$\pi_c(i) = \frac{M - M_{-f_i}}{M}.$$

Definition 7. The prediction conviction, $pi_p$, of feature i is $$\pi_p(i) = \frac{\frac{1}{\xi}\sum_{i=0}^{\xi} M_{-f_i}}{M_{-f_i}}.$$

Targeted and Untargeted Techniques for Determining Conviction and Other Measures In some embodiments, any of the feature information measures, conviction or contribution measures (e.g., surprisal, prediction conviction, familiarity conviction, and/or feature prediction contribution and/or feature prediction conviction) may be determined using an "untargeted" and/or a "targeted" approach. In the untargeted approach, the measure (e.g., a conviction measure) is determined by holding out the item in question and then measuring information gain associated with putting the item back into the model. Various examples of this are discussed herein. For example, to measure the untargeted conviction of a case (or feature), the conviction is measured in part based on taking the case (or feature) out of the model, and then measuring the information associated with adding the case (or feature) back into the model.

In order to determine a targeted measure, such as surprisal, conviction, or contribution of a data element (e.g., a case or a feature), in contrast to untargeted measures, everything is dropped from the model except the features or cases being analyzed (the "analyzed data element(s)") and the target features or cases ("target data element(s)"). Then the measure is calculated by measure the conviction, information gain, contribution, etc. based on how well the analyzed data element(s) predict the target data element(s) in the absence of the rest of the model.

In each instance that a measure, such as a surprisal, conviction, contribution, etc. measure, is discussed herein, the measure may be determined using either a targeted approach or an untargeted approach. For example, when the term "conviction" is used, it may refer to targeted or untargeted prediction conviction, targeted or untargeted familiarity conviction, and/or targeted or untargeted feature prediction conviction. Similarly, when surprisal, information, and/or contribution measures are discussed without reference to either targeted or untargeted calculation techniques, then reference may be being made to either a targeted or untargeted calculation for the measure.

Example Processes for Synthetic Data Generation

In some embodiments, the techniques discussed herein include synthetic data generation. The synthetic data generation may be performed before, after, or during any of the other techniques described herein. Similarly, the synthetic data generation may be performed for any technology area, such as those discussed herein, including but not limited to self-driving vehicles data, image labeling data, manufacturing data, smart home data, and the like.

In some embodiments, the techniques herein include receiving a request for synthetic training data. For example, a system or system operator may request additional or different training data in order to train a computer-based reasoning system that will be used to control a controllable system. In some cases, the controllable system or operator may request anonymous data that is similar to a current training data set (or different from, but still anonymized). In other cases, the system or operator may require more data than is in the current training data set, and therefore may request additional data to augment the current training data set. In some cases, synthetic data may be requested to direct sampling via a reinforcement learning process. The synthesized data (perhaps combined with original training data or by itself) may be used as part of a computer-based reasoning system to cause control of a system. Many controllable systems can be controlled with the techniques herein, such as controllable machinery, autonomous vehicles, lab equipment, etc. In some embodiments, the request for synthetic data may include a target surprisal and/or conviction for the target data. In some embodiments, if low target surprisal is requested, then the synthetic data may be close to and not differ much from existing data. If high target surprisal is requested, then the generated synthetic data may differ much from the existing data. In some embodiments, optionally, the received request for synthetic data may also include one or more conditions for the synthetic data. These conditions may be restrictions on the generated synthetic data. For example, if the synthetic data being generated is for a checkers game, a condition on the data may be that includes only moves that are part of a winning strategy, that survive for at least S moves without losing, and/or win within W moves. Another set of conditions on the synthetic training data may be a particular board layout (e.g., the starting checkers game state, the current checkers game state), etc.

When the received request includes one or more conditions for the synthetic data, the closest cases to the conditions may be determined as focal cases. In some embodiments, the closest cases to the conditions may be determined as the K nearest neighbors (KNN) for the conditions (e.g., the K cases that are "closest" to meeting the conditions). For example, if there are two features that have conditions, A and B, and the conditions are A=3 and B=5, then the KNN for the conditions would be those cases that are closest to meeting the conditions of A=3 and B=5. In some instances, if there are more than K cases that fully meet the condition (e.g., there are more than K cases that have feature values of A=3 and B=5, which scenario will be more common if the conditions are on features which are nominal or categorical), then K cases may be selected from those cases meeting the condition. These K cases may be selected from among those that fully meet the conditions can be done randomly, or using any appropriate technique, such as by looking at the surprisal and/or conviction of those cases and choosing the K with the highest (or lowest) surprisal (or conviction), or all of the K cases may be used. In order to determine what K cases are "closest" any distance measurements discussed herein may be used, including Euclidean distance, Minkowski distance, Damerau-Levenshtein distance, Kullback-Leibler divergence, 1−Kronecker delta, and/or any other distance measure, metric, pseudometric, premetric, index, etc.

The conditions may be any appropriate single, multiple, and/or combination of conditions. For example, individual values may be given for features (e.g., A=5 and B=3); ranges may be given (e.g., A>=5 and B<4); multiple values may be given (e.g., E="cat", "dog", or "horse"); one or more combination can be given (e.g., [(A>1 and B<99) or (A=7 and E="horse")]).

The values for the conditioned features of the synthesized case may be set or determined based on the corresponding values for the features in the focal cases (e.g., determined as the KNN of the conditions, as described above). For example, for each conditioned feature, the mean, mode, an interpolated or extrapolated value, most-often occurring value of the corresponding feature from among the focal cases may be chosen as the value for the feature in the synthetic data element. In some embodiments, the distribution of the values of the conditioned features in the focal cases may be calculated and a value may be chosen based on that distribution, which may include the maximum likelihood value, selection via random sampling, inverse distance weighting, kernel functions, or other function or learned metric. In some embodiments, the values for conditioned features are set to (or based on) the condition values (vs. the values for the conditioned feature in the focal cases as described above). For example, if the conditions are A=5 and B=3, then feature A may be set to the value 5 and feature B may be set to the value 3 regardless of the values of that feature in the focal cases.

When there are no conditions received with the request for synthetic data, a random case may be selected as a focal case or a set of random cases may be selected as the set of focal cases. When there are no conditions, then, in some embodiments, the techniques begin by selecting a random case, selecting the first feature, or a random feature, or the next feature prioritized by some metric, importance, conviction, or ranking, and select the value from the selected case as the value of the feature in the synthetic data value. Then, the techniques may proceed as described. For example, in some embodiments, the value for a first feature (e.g., A=12) is chosen from the chosen case and then the KNN are determined. The KNN may be the K cases that are closest to having that value (e.g., A=12) are chosen as the focal cases.

After the focal cases for the synthetic data have been determined (whether or not based on received conditions), then a first undetermined feature is selected. When there are no conditions, selecting the first undetermined feature comprises selecting one of the features from the randomly-selected case that was not previously determined. When there are conditions on the synthetic data, then the conditioned features are first set based on the conditions and the focal cases that are KNN of the condition (as described elsewhere herein). After the first feature(s) have been determined (whether or not there are conditions), then the next (undetermined) feature may be selected. Selecting which undetermined feature to determine next can be done in any appropriate manner, such as selecting randomly among the remaining undetermined features, choosing the feature with the highest or lowest conviction, etc.

The distribution of values for the undetermined feature is then determined. For example, the distribution may be assumed to be log normal, Laplace, Gaussian, normal, or any other appropriate distribution, and be centered, e.g., on the computed undetermined feature value or on the median or mode of the values for the undetermined feature in the set of focal cases (or in the training data). The distribution for the feature can also be determined by parameterizing it via surprisal using the distribution's entropy. For example, if a distribution has an error, a, with the error modeled as a Gaussian distribution, and we know that the entropy of a sample from Gaussian distribution is $1/2 \log(2\pi e\sigma^2)$, we can adjust the error parameter to match a specified level of surprisal for that feature when taking a sample of the feature as the synthesized value. Alternatively, surprisal and/or conviction may also be determined by measuring other types of information, such as Kullback-Leibler Divergence ("KL divergence" or "$Div_{KL}(x)$") or cross entropy, and a desired surprisal and/or conviction can be attained by adjusting the corresponding parameters for the distribution. Methods describing distance from a point as a probability can be used to map the surprisal (as one example) to distance, and may include any relevant distribution. When synthesizing data for multiple features, each feature can be set to the same surprisal, or alternatively each feature can "use up" the surprisal for the synthetic data parameterizing each feature's distribution with its own amount of surprisal, treating total surprisal of the synthesized data as a budget or goal for all of the features together. Some features may be accorded more surprisal than others, and therefore may "use up" more of the surprisal budget. In cases where higher surprisal is desired, distributions will typically be wider. In situations where lower surprisal is desired, distributions will typically be narrower. The relative surprisal accorded each feature may be set or determined in any appropriate manner, including assigning the relative amount of surprisal randomly, having the relative amounts set by a human operator, and/or setting them based on a particular measure or metric, such as having the features with the lowest (or highest) surprisal in the training data being accorded more of the surprisal budget. Extensive additional discussion of these techniques are given elsewhere herein.

The value of for the undetermined feature for the synthetic case may then be determined based on the determined distribution. Determining the value based on the determined distribution comprises selecting a value (or sampling) randomly based on a random number and the determined distribution. In some embodiments, this is performed via inverse transform sampling. In some embodiments, the distribution does not have a closed form solution to translate a uniformly chosen random number to a random number from the parameterized distribution, and techniques to generate the required random number include rejection sampling, the Box-Muller transform, and the Ziggurat algorithm. In some embodiments, the techniques may continue to determine values for features until there are no more undetermined features. In order to determine values for each subsequent undetermined feature in the synthetic data element, the already-determined feature values are used to determine the K nearest neighbors (a new set of focal cases) to that set of already-determined values (e.g., all of the feature values set to that point). For example, if values A=3, B=5, and C=9.7 have already been set for the synthetic data element, either via conditioning or based on synthetic data generation (and value D is next to be determined), then the K nearest neighbors to the values for A, B, and C will be the new set of focal cases. Then the distribution (e.g., DistD) for that subsequent undetermined feature (e.g., feature D) is determined for the new set of focal cases. A value for the subsequent undetermined feature (e.g., D) is the determined based on a random sampling of the distribution (e.g., DistD) determined for that feature. When all of the feature values have been determined, then the synthetic data element is complete.

In some embodiments, optionally, the synthetic data element can be tested for fitness. Testing the synthetic data element for fitness can include any appropriate technique, including confirming that the synthetic data element meets any received conditions, or whether it meets other criteria, such as a fitness score or function. The fitness score or function may be any appropriate function. In some embodiments, the fitness function depends on the domain of the synthetic data element and can be a measure of performance of the synthetic data element as compared to other data elements. For example, the fitness function may be a measure of speed, processing efficiency, or some other measure of performance. Further, the fitness function might be modified at random, to introduce additional variation.

Upon completion of the synthetic data element, optionally, it can be provided or used as synthetic data. For example, the synthetic data element may be provided in response to the received request for synthetic data. In some embodiments, multiple synthetic data elements may be created in response to receiving the original request, and may be provided in response to that request. Providing the synthetic data element(s) in response to the request can take any appropriate form, including having them sent via HTTP, HTTPS, FTP, FTPS, via an API, a remote procedure call, a function or procedure call, etc., and/or in response to one of the foregoing.

In some embodiments, optionally, after one or more synthetic data elements have been created, control of a controllable system can be caused based at least in part on the synthetic data element(s) created using techniques herein. For example, a computer-based reasoning model may be trained based on the synthetic data element(s) and that model may be used to control a controllable system. Numerous examples of causing control of a controllable system are discussed herein and include, manufacturing control, vehicle control, image labelling control, smart device control, federated system control, etc.

Parameterizing Synthetic Data Via Prediction Conviction Examples

As discussed elsewhere, various embodiments use the double-sided exponential distribution as a maximum entropy distribution of distance in Lp space. One may then be able to derive a closed form solution for how to scale the exponential distributions based on a prediction conviction value. For example, a value, v, for the prediction conviction may be expressed as $$v = \pi_p(x) = \frac{EI}{I(x)} \quad (13)$$

which may be rearranged as $$I(x) = \frac{EI}{v}. \quad (14)$$

Substituting in the self-information described elsewhere herein:

$$\frac{\varphi(x)}{\|r(x)\|_p} = \frac{EI}{v}. \quad (15)$$

In some embodiments, that the units on both sides of Equation 15 match. This may be the case in circumstances where he natural logarithm and exponential in the derivation of Equation 15 cancel out, but leave the resultant in nats. We can rearrange in terms of distance contribution as:

$$\varphi(x) = \frac{\|r(x)\|_p \cdot EI}{v}. \quad (16)$$

If we let p=0, which may be desirable for conviction and other aspects of the similarity measure, then we can rewrite the distance contribution in terms of its parameter, $\lambda_i$, with expected mean of $$\frac{1}{\lambda_i}.$$

This becomes $$\Pi_i E(1/\lambda_i) = \frac{\Pi_i r_i EI}{v}. \quad (17)$$

In some embodiments, due to the number of ways surprisal and/or conviction may be assigned or calculated across the features, various solutions may exist. However, unless otherwise specified or conditioned, embodiments may include distributing surprisal (as one example) uniformly across the features, holding expected proportionality constant. In some embodiments, the distance contribution may become the mean absolute error for the exponential distribution, such as:

$$E(1/\lambda_i) = r_i \frac{EI}{v}. \quad (18)$$

and solving for the $\lambda_i$ to parameterize the exponential distributions may result in:

$$\lambda_i = \frac{v}{r_i EI}. \quad (19)$$

In some embodiments, Equation 19, when combined with the value of the feature, may become the distribution by which to generate a new random number under the maximum entropy assumption of exponentially distributed distance from the value.

Reinforcement Learning Examples

In some embodiments, the techniques can generate data with a controlled amount of surprisal (and similar approaches can be performed using conviction, which may be a novel way to characterize the classic exploration versus exploitation trade off in searching for an optimal solution to a goal. Traditionally, pairing a means to search, such as Monte Carlo tree search, with a universal function approximator, such as neural networks, may solve difficult reinforcement learning problems without domain knowledge. Because the data synthesis techniques described herein utilize the universal function approximator model (kNN) itself, it enables the techniques to be use in a reinforcement learning architecture that is similar and tightly coupled, as described herein.

In some embodiments, setting the conviction of the data synthesis to "1" (or any other appropriate value) yields a balance between exploration and exploitation. Because, in some embodiments, the synthetic data generation techniques described herein can also be conditioned, the techniques may condition the search on both the current state of the system, as it is currently observed, and a set of goal values for features. In some embodiments, as the system is being trained, it can be continuously updated with the new training data. Once states are evaluated for their ultimate outcome, a new set of features or feature values can be added to all of the observations indicating the final scores or measures of outcomes (as described elsewhere herein, e.g., in relation to outcome features). Keeping track of which observations belong to which training sessions (e.g., games) may be beneficial as a convenient way to track and update this data. In some embodiments, given that the final score or multiple goal metrics may already be in the kNN database, the synthetic data generation may allow querying for new data conditioned upon having a high score or winning conditions (or any other appropriate condition), with a specified amount of conviction.

In some embodiments, the techniques herein provide a reinforcement learning algorithm that can be queried for the relevant training data for every decision, as described elsewhere herein. The commonality among the similar cases, boundary cases, archetypes, etc. can be combined to find when certain decisions are likely to yield a positive outcome, negative outcome, or a larger amount of surprisal thus improving the quality of the model. In some embodiments, by seeking high surprisal moves, the system will improve the breadth of its observations.

Additional Reinforcement Learning and Other Embodiments

In some embodiments, the techniques may be used for reinforcement learning. For example, each time a synthetic training case is created, then the set of training cases can be updated and new synthetic data can be generated based on the updated set of training cases. In some embodiments, the techniques herein are used for reinforcement learning. For reinforcement learning, the outcome or goal feature(s) (e.g., the score of a game, or having a winning checkers match) are treated as conditioned inputs or features. For example, in the checkers example, the synthetic data element is generated with conditions of the current game board setup and where the move was part of a winning strategy. The "winning strategy" feature may have been set in the training data set. For example, once a game has been won, an outcome feature is set to either "winning" or "losing" for all moves that had been made in the game. As such, each move in a winning game has the outcome feature set to "winning" and each move in a losing game has outcome set to "losing." As such, then the data is conditioned to pick only moves that are part of a winning game, that feature (outcome="winning") is used in the KNN calculation discussed elsewhere herein.

The reinforcement learning scenarios can also include ranges (like a score above, below, or within a certain threshold), and other criteria. For example, as discussed elsewhere herein, the techniques herein can be useful in reinforcement learning situations where synthetic data is needed on expensive, dangerous, and/or hard to reproduce scenarios. For example, if pipelines only fail (e.g., leak, explode, become clogged) 0.001% of the time, but training data is needed to train a computer-based reasoning system to detect when those scenarios are going to happen, the techniques herein can be used to synthesize training data for those rare cases. This allows additional training data for pipeline failure to be gathered without incurring the difficulty, danger, and cost of actual pipeline failures. In such an example, the failure of the pipeline could be one of the conditions on the synthetic data. So, as data is being generated, the focal cases determined will be those associated with pipeline failure, and the subsequently-generated features will represent the distribution of values of those features within the conditioned data.

In some embodiments, the techniques may be used to create synthetic data that replicates users, devices, etc. For example, data that is based on, is similar to user data (or device data, etc.) can be created using the techniques herein. Consider user data that cannot be used (because it is not anonymous) and where one would prefer not to anonymize the data. That data can be used to create synthetic user data. If the data includes personally identifiable information as features (e.g., name, SSN, etc.), those features could be assigned random values, and the rest of the features can be synthesized based on user data (and possibly conditions) using the techniques discussed herein. Alternatively, in some embodiments, features containing personally-identifiable information could also be generated based on existing user data, but with very high surprisal, creating a much wider distribution than seen in the user data.

Systems for Improved Searching and Querying in Computer-Based Reasoning Systems

Figure 2:
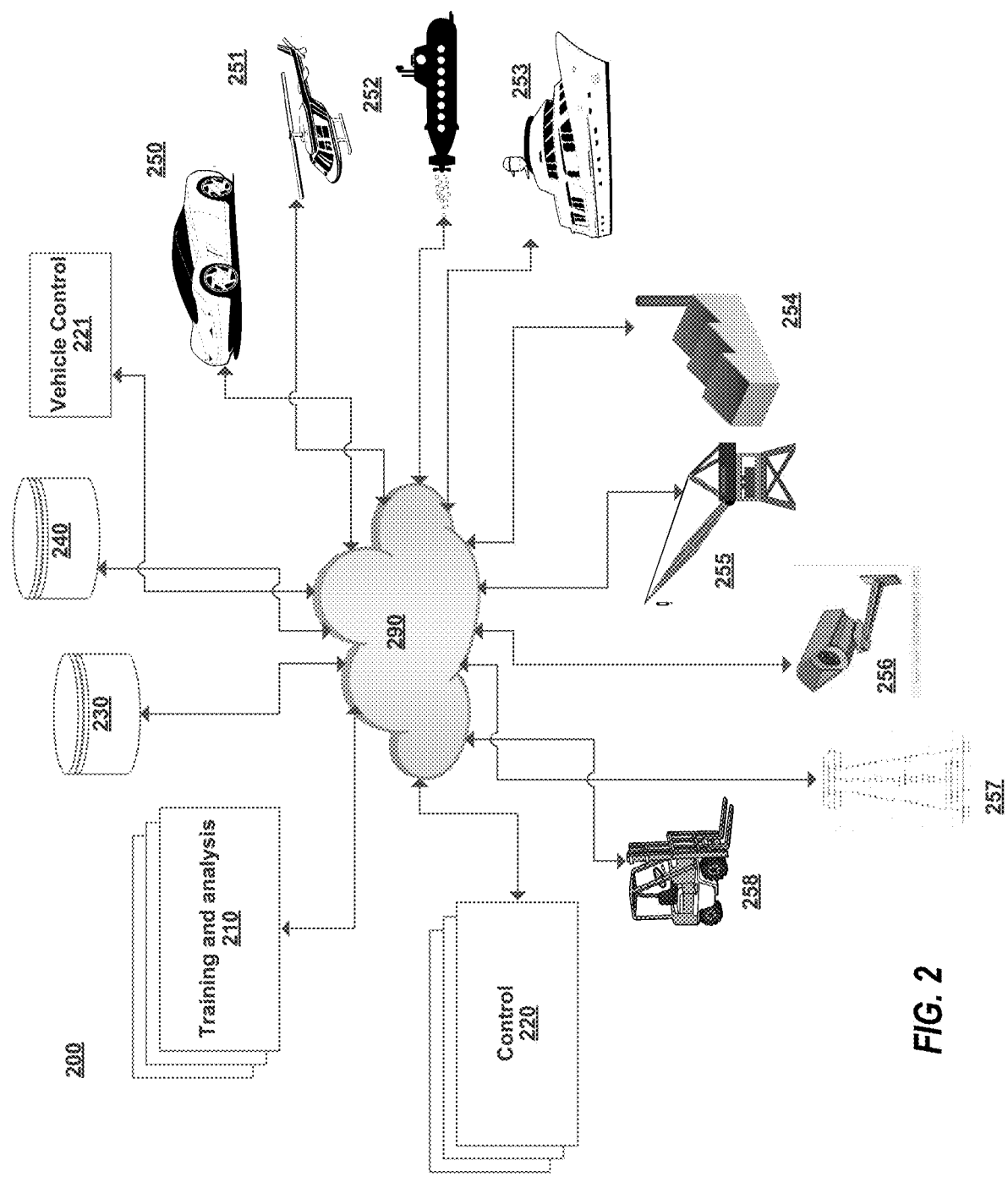
FIG. 2 is a block diagram depicting example systems for improved searching and querying in computer-based reasoning systems.

FIG. 2 is a block diagram depicting example systems for improved searching and querying in computer-based reasoning systems. Numerous devices and systems are coupled to a network 290. Network 290 can include the internet, a wide area network, a local area network, a Wi-Fi network, any other network or communication device described herein, and the like. Further, numerous of the systems and devices connected to 290 may have encrypted communication there between, VPNs, and or any other appropriate communication or security measure. System 200 includes a training and analysis system 210 coupled to network 290. The training and analysis system 210 may be used for collecting data related to systems 250-258 and creating computer-based reasoning models based on the training of those systems. Further, training and analysis system 210 may perform aspects of processes 100 and/or 400 described herein. Control system 220 is also coupled to network 290. A control system 220 may control various of the systems 250-258. For example, a vehicle control 221 may control any of the vehicles 250-253, or the like. In some embodiments, there may be one or more network attached storages 230, 240. These storages 230, 240 may store training data, computer-based reasoning models, updated computer-based reasoning models, and the like. In some embodiments, training and analysis system 210 and/or control system 220 may store any needed data including computer-based reasoning models locally on the system.

FIG. 2 depicts numerous systems 250-258 that may be controlled by a control system 220 or 221. For example, automobile 250, helicopter 251, submarine 252, boat 253, factory equipment 254, construction equipment 255, security equipment 256, oil pump 257, or warehouse equipment 258 may be controlled by a control system 220 or 221.

Example Processes for Controlling Systems

Figure 4:
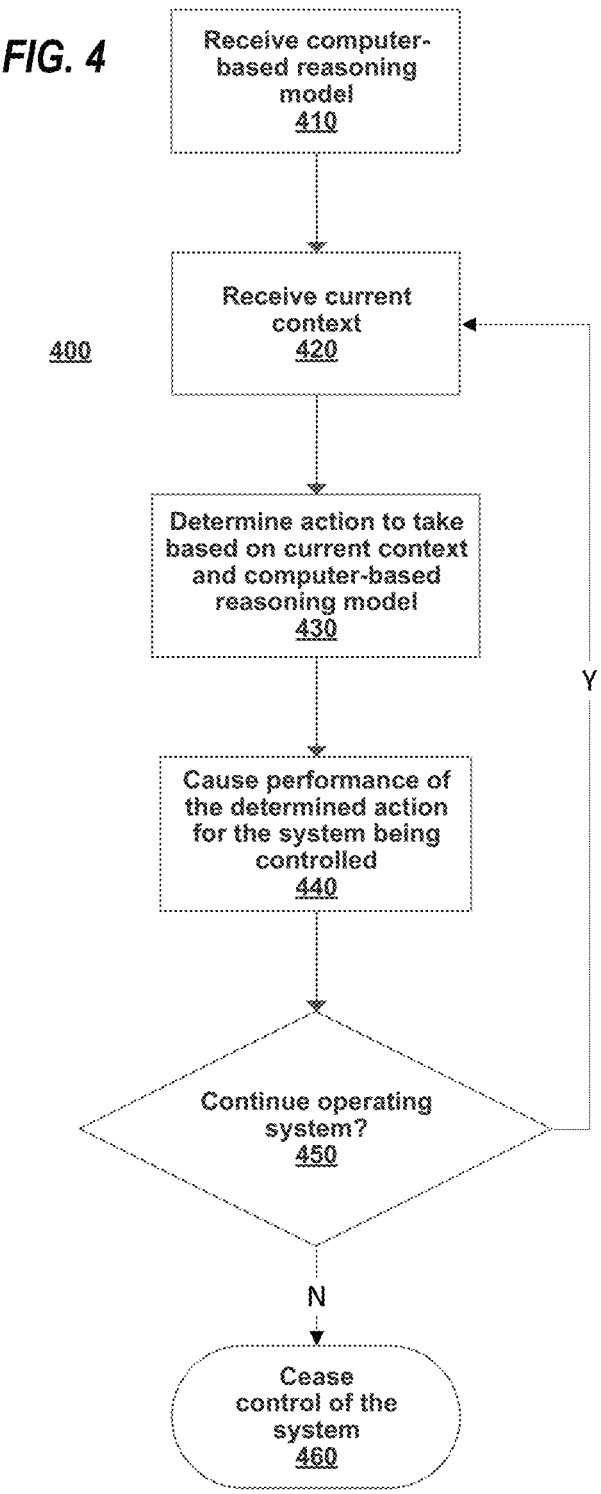
FIG. 4 is a flow diagram depicting example processes for controlling systems.

FIG. 4 depicts an example process 400 for controlling a system. In some embodiments and at a high level, the process 400 proceeds by receiving or receiving 410 a computer-based reasoning model for controlling or causing control of the system. The computer-based reasoning model may be one created using process 100, as one example. In some embodiments, the process 400 proceeds by receiving 420 a current context for the system, determining 430 an action to take based on the current context and the computer-based reasoning model, and causing 440 performance of the determined action (e.g., labelling an image, causing a vehicle to perform the turn, lane change, waypoint navigation, etc.). If operation of the system continues 450, then the process returns to receive 420 the current context, and otherwise discontinues 460 control of the system. In some embodiments, causing 199 performance of a selected action may include causing 440 performance of a determined action (or vice-versa).

As discussed herein the various processes 100, 400, etc. may run in parallel, in conjunction, together, or one process may be a subprocess of another. Further, any of the processes may run on the systems or hardware discussed herein. The features and steps of processes 100, 400 could be used in combination and/or in different orders.

Self-Driving Vehicles

Returning to the top of the process 400, it begins by receiving 410 a computer-based reasoning model for controlling or causing control of the system. The computer-based reasoning model may be received in any appropriate matter. It may be provided via a network 290, placed in a shared or accessible memory on either the training and analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220 and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. For example, turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest (or most similar) to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, pseudometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 430 action is then caused 440. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 221 may determine 430 what action to take for the helicopter based on the received 420 context. The vehicle control 221 may then cause the helicopter to perform the determined action, for example, by sending instructions related to the action to the appropriate controls in the helicopter. In the driving example, the vehicle control 221 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 410 more current contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be used for image-labeling systems. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal and/or conviction of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, processes 100, 400 may include determining the surprisal and/or conviction of each image (or multiple images) and the associated labels or of the aspects of the computer-based reasoning model. The surprisal and/or conviction for the one or more images may be determined and a determination may be made whether to select or include the one or more images (or aspects) in the image-labeling computer-based reasoning model based on the determined surprisal and/or conviction. While there are more sets of one or more images with labels to assess, the process may return to determine whether more image or label sets should be included or whether aspects should be included and/or changed in the model. Once there are no more images or aspects to consider, the process can turn to controlling or causing control of the image analysis system using the image-labeling computer-based reasoning.

In some embodiments, process 100 may determine (e.g., in response to a request) the search result (e.g., k nearest neighbors) in the computer-based reasoning model for use in the image-labeling computer-based reasoning model. Based on those search results, the process can cause 199 control of an image-labeling system using process 400. For example, if the data elements are related to images and labels applied to those images, then the image-labeling computer-based reasoning model trained on that data will apply labels to incoming images. Process 400 proceeds by receiving 410 an image-labeling computer-based reasoning model. The process proceeds by receiving 420 an image for labeling. The image-labeling computer-based reasoning model is then used to determine 430 labels for the input image. The image is then labeled 440. If there are more 450 images to label, then the system returns to receive 410 those images and otherwise ceases 460. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The processes 100, 400 may also be used for manufacturing and/or assembly. For example, conviction can be used to identify normal behavior versus anomalous behavior of such equipment. Using the techniques herein, a crane (e.g., crane 255 of FIG. 2), robot arm, or other actuator is attempting to "grab" something and its surprisal and/or conviction is too high, it can stop, sound an alarm, shutdown certain areas of the facility, and/or request for human assistance. Anomalous behavior that is detected via conviction among sensors and actuators can be used to detect when there is some sort breakdown, unusual wear or mechanical or other malfunction, etc. It can also be used to find damaged equipment for repairs or buffing or other improvements for any robots or other machines that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

As an additional example in the manufacturing or assembly context, vibration data can be used to diagnose (or predict) issues with equipment. In some embodiments, the training data for the computer-based reasoning system would be vibration data (e.g., the output of one or more piezo vibration sensors attached to one or more pieces of manufacturing equipment) for a piece of equipment along with diagnosis of an issue or error that occurred with the equipment. The training data may similarly include vibration data for the manufacturing equipment that is not associated with an issue or error with the equipment. In subsequent operation of the same or similar equipment, the vibration data can be collected, and the computer-based reasoning model can be used to assess that vibration data to either diagnose or predict potential issues or errors with the equipment. For example, the vibration data for current (or recent) operation of one or more pieces of equipment, the computer-based reasoning model may be used to predict, diagnose, or otherwise determine issues or errors with the equipment. As a more specific example, a current context of vibration data for one or more pieces of manufacturing equipment may result in a diagnosis or prediction of various conditions, including, but not limited to: looseness of a piece of equipment (e.g., a loose screw), an imbalance on a rotating element (e.g., grime collected on a rotating wheel), misalignment or shaft runout (e.g., machine shafts may be out of alignment or not parallel), wear (e.g., ball or roller bearings, drive belts or gears become worn, they might cause vibration). As a further example, misalignment can be caused during assembly or develop over time, due to thermal expansion, components shifting or improper reassembly after maintenance. When a roller or ball bearing becomes pitted, for instance, the rollers or ball bearing will cause a vibration each time there is contact at the damaged area. A gear tooth that is heavily chipped or worn, or a drive belt that is breaking down, can also produce vibration. Diagnosis or prediction of the issue or error can be made based on the current or recent vibration data, and a computer-based reasoning model training data from the previous vibration data and associated issues or errors. Diagnosing or predicting the issues of vibration can be especially important where the vibration can cause other issues. For example, wear on a bearing may cause a vibration that then loosens another piece of equipment, which then can cause other issues and damage to equipment, failure of equipment, and even failure of the assembly or manufacturing process.

In some embodiments, techniques herein may determine (e.g., in response to a request) the surprisal and/or conviction of one or more data elements (e.g., of the manufacturing equipment) or aspects (e.g., features of context-action pairs or aspects of the model) to potentially include in the manufacturing control computer-based reasoning model. The surprisal and/or conviction for the one or more manufacturing elements may be determined and a determination may be made whether to select or include the one or more manufacturing data elements or aspects in the manufacturing control computer-based reasoning model based on the determined surprisal and/or conviction. While there are more sets of one or more manufacturing data elements or aspects to assess (e.g., from additional equipment and/or from subsequent time periods), the process may return to determine whether more manufacturing data elements or aspects sets should be included in the computer-based reasoning model. Once there are no more manufacturing data elements or aspects to consider for inclusion, the process can turn to controlling or causing control of the manufacturing system using the manufacturing control computer-based reasoning system.

In some embodiments, process 100 may determine (e.g., in response to a request) the search result (e.g., k nearest neighbors) in the computer-based reasoning model for use in the manufacturing control computer-based reasoning model. Based on those search results, the process can cause 199 control of a manufacturing system may be accomplished by process 400. For example, if the data elements are related to manufacturing data elements or aspects, then the manufacturing control computer-based reasoning model trained on that data will cause control manufacturing or assemble. Process 400 proceeds by receiving 410 a manufacturing control computer-based reasoning model. The process proceeds by receiving 420 a context. The manufacturing control computer-based reasoning model is then used to determine 430 an action to take. The action is then performed by the control system (e.g., caused by the manufacturing control computer-based reasoning system). If there are more 450 contexts to consider, then the system returns to receive 410 those contexts and otherwise ceases 460. In such embodiments, the manufacturing control computer-based reasoning model may be used to control a manufacturing system. The chosen actions are then performed by a control system.

Smart Voice Control

The processes 100, 400 may be used for smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, processes 100, 400 may include determining (e.g., in response to a request) the surprisal and/or conviction of one or more data elements (e.g., of the smart voice system) or aspects (e.g., features of the data or parameters of the model) to potentially include in the smart voice system control computer-based reasoning model. The surprisal and/or conviction for the one or more smart voice system data elements or aspects may be determined and a determination may be made whether to include the one or more smart voice system data elements or aspects in the smart voice system control computer-based reasoning model based on the determined surprisal and/or conviction. While there are more sets of one or more smart voice system data elements or aspects to assess, the process may return to determine whether more smart voice system data elements or aspects sets should be included. Once there are no more smart voice system data elements or aspects to consider, the process can turn to controlling or causing control of the smart voice system using the smart voice system control computer-based reasoning model.

In some embodiments, process 100 may determine (e.g., in response to a request) the search result (e.g., k nearest neighbors) in the computer-based reasoning model for use in the smart voice computer-based reasoning model. Based on those search results, the process can cause 199 control of a smart voice system using process 400. For example, if the data elements are related to smart voice system actions, then the smart voice system control computer-based reasoning model trained on that data will control smart voice systems. Process 400 proceeds by receiving 410 a smart voice computer-based reasoning model. The process proceeds by receiving 420 a context. The smart voice computer-based reasoning model is then used to determine 430 an action to take. The action is then performed by the control system (e.g., caused by the smart voice computer-based reasoning system). If there are more 450 contexts to consider, then the system returns to receive 410 those contexts and otherwise ceases 460. In such embodiments, the smart voice computer-based reasoning model may be used to control a smart voice system. The chosen actions are then performed by a control system.

Control of Federarted Devices

The processes 100, 400 may also be used for federated device systems. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, processes 100, 400 may include determining the surprisal and/or conviction of one or more data elements or aspects of the federated device control system for potential inclusion in the federated device control computer-based reasoning model. The surprisal and/or conviction for the one or more federated device control system data elements may be determined and a determination may be made whether to select or include the one or more federated device control system data elements in the federated device control computer-based reasoning model based on the determined surprisal and/or conviction. While there are more sets of one or more federated device control system data elements or aspects to assess, the process may return to determine whether more federated device control system data elements or aspect sets should be included. Once there are no more federated device control system data elements or aspects to consider, the process can turn to controlling or causing control of the federated device control system using the federated device control computer-based reasoning model.

In some embodiments, process 100 may determine (e.g., in response to a request) the search result (e.g., k nearest neighbors) in the computer-based reasoning model for use in the federated device computer-based reasoning model. Based on those search results, the process can cause 199 control of a federated device system using process 400. For example, if the data elements are related to federated device system actions, then the federated device control computer-based reasoning model trained on that data will control federated device control system. Process 400 proceeds by receiving 410 a federated device control computer-based reasoning model. The process proceeds by receiving 420 a context. The federated device control computer-based reasoning model is then used to determine 430 an action to take. The action is then performed by the control system (e.g., caused by the federated device control computer-based reasoning system). If there are more 450 contexts to consider, then the system returns to receive 410 those contexts and otherwise ceases 460. In such embodiments, the federated device control computer-based reasoning model may be used to control federated devices. The chosen actions are then performed by a control system.

Control and Automation of Experiments

The processes 100, 400 may also be used to control laboratory experiments. For example, many lab experiments today, especially in the biological and life sciences, but also in agriculture, pharmaceuticals, materials science and other fields, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility or fitness functions. Automated lab experiments (including pharmaceuticals, biological and life sciences, material science, etc.) may have actuators and may put different chemicals, samples, or parts in different combinations and put them under different circumstances. Using conviction to guide the machines enables them to home in on learning how the system under study responds to different scenarios, and, for example, searching areas of greatest uncertainty (e.g., the areas with low conviction as discussed herein). Conceptually speaking, when the conviction or surprisal is combined with a fitness, utility, or value function, especially in a multiplicative fashion, then the combination is a powerful information theoretic approach to the classic exploration vs exploitation trade-offs that are made in search processes from artificial intelligence to science to engineering. Additionally, such a system can automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. This is discussed extensively elsewhere herein. If the system has multiple kinds of sensors that have "costs" (e.g., monetary, time, computation, etc.) or cannot be all activated simultaneously, the feature entropies or convictions could be used to activate or deactivate the sensors to reduce costs or improve the distinguishability of the experimental results.

In the context of agriculture, growers may experiment with various treatments (plant species or varietals, crop types, seed planting densities, seed spacings, fertilizer types and densities, etc.) in order to improve yield and/or reduce cost. In comparing the effects of different practices (treatments), experimenters or growers need to know if the effects observed in the crop or in the field are simply a product of the natural variation that occurs in every ecological system, or whether those changes are truly a result of the new treatments. In order to ameliorate the confusion caused by overlapping crop, treatment, and field effects, different design types can be used (e.g., demonstration strip, replication control or measurement, randomized block, split plot, factorial design, etc.). Regardless, however, of the type of test design type used, determination of what treatment(s) to use is crucial to success. Using the techniques herein to guide treatment selection (and possible design type) enables experimenters and growers to home in on how the system under study responds to different treatments and treatment types, and, for example, searching areas of greatest uncertainty in the "treatment space" (e.g., what are the types of treatments about which little is known?). Conceptually, the combination of conviction or surprisal with a value, utility, or fitness function such as yield, cost, or a function of yield and cost, become a powerful information theoretic approach to the classic exploration vs exploitation trade-offs that are made in search processes from artificial intelligence to science to engineering. Growers can use this information to choose treatments balancing exploitation (e.g., doing things similar to what has produced high yields previously) and exploration (e.g., trying treatments unlike previous ones, with yet-unknown results). Additionally, the techniques can automate experiments on treatments (either in selection of treatments, designs, or robotic or automated planting using the techniques described herein) where it can predict the most effective approach, and automatically perform the planting or other distribution (e.g., of fertilizer, seed, etc.) required of to perform the treatment. Further, like in the other embodiments discussed herein, it could indicate (e.g., raise alarms) to human operators when the results are anomalous, or even tell which features being measured are most useful or when measurements are not useful to characterize the outcomes (e.g., and may possibly be discarded or no longer measured). If the system has types of sensors (e.g., soil moisture, nitrogen levels, sun exposure) that have "costs" (e.g., monetary, time, computation, etc.) or cannot be all collected or activated simultaneously, the feature entropies or convictions could be used to activate or deactivate the sensors to reduce costs while protecting the usefulness of the experimental results.

In some embodiments, processes 100, 400 may include determining (e.g., in response to a request) the surprisal and/or conviction of one or more data elements or aspects of the experiment control system. The surprisal and/or conviction for the one or more experiment control system data elements or aspects may be determined and a determination may be made whether to select or include the one or more experiment control system data elements or aspects in an experiment control computer-based reasoning model based on the determined surprisal and/or conviction. While there are more sets of one or more experiment control system data elements or aspects to assess, the process may return to determine whether more experiment control system data elements or aspects sets should be included. Once there are no more experiment control system data elements or aspects to consider, the process can cause 199 control of the experiment control system using the experiment control computer-based reasoning model.

In some embodiments, process 100 may determine (e.g., in response to a request) the search result (e.g., k nearest neighbors) in the computer-based reasoning model for use in the experiment control computer-based reasoning model. Based on those search results, the process can control or cause 199 control of an experiment control system using process 400. For example, if the data elements are related to experiment control system actions, then the experiment control computer-based reasoning model trained on that data will control experiment control system. Process 400 proceeds by receiving 410 an experiment control computer-based reasoning model. The process proceeds by receiving 420 a context. The experiment control computer-based reasoning model is then used to determine 430 an action to take. The action is then performed by the control system (e.g., caused by the experiment control computer-based reasoning system). If there are more 450 contexts to consider, then the system returns to receive 410 those contexts and otherwise ceases 460. In such embodiments, the experiment control computer-based reasoning model may be used to control experiment. The chosen actions are then performed by a control system.

Control of Energy Transfer Systems

The processes 100, 400 may also be used for control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, processes 100, 400 may include determining (e.g., in response to a request) the surprisal and/or conviction of one or more data elements or aspects of the energy transfer system. The surprisal and/or conviction for the one or more energy transfer system data elements or aspects may be determined and a determination may be made whether to select or include the one or more energy transfer system data elements or aspects in energy control computer-based reasoning model based on the determined surprisal and/or conviction. While there are more sets of one or more energy transfer system data elements or aspects to assess, the process may return to determine whether more energy transfer system data elements or aspects should be included. Once there are no more energy transfer system data elements or aspects to consider, the process can turn to controlling or causing control of the energy transfer system using the energy control computer-based reasoning model.

In some embodiments, process 100 may determine (e.g., in response to a request) the search result (e.g., k nearest neighbors) in the computer-based reasoning model for use in the energy transfer computer-based reasoning model. Based on those search results, the process can cause 199 control of an energy transfer system using process 400. For example, if the data elements are related to energy transfer system actions, then the energy control computer-based reasoning model trained on that data will control energy transfer system. Process 400 proceeds by receiving 410 an energy control computer-based reasoning model. The process proceeds by receiving 420 a context. The energy control computer-based reasoning model is then used to determine 430 an action to take. The action is then performed by the control system (e.g., caused by the energy control computer-based reasoning system). If there are more 450 contexts to consider, then the system returns to receive 410 those contexts and otherwise ceases 460. In such embodiments, the energy control computer-based reasoning model may be used to control energy. The chosen actions are then performed by a control system.

Health Care Decision Making, Prediction, and Fraud Protection

The processes 100, 400 may also be used for health care decision making, prediction (such as outcome prediction), and fraud detection. For example, some health insurers require pre-approval, pre-certification, pre-authorization, and/or reimbursement for certain types of healthcare procedures, such as healthcare services, administration of drugs, surgery, hospital visits, etc. When analyzing pre-approvals, a health care professional must contact the insurer to obtain their approval prior to administering care, or else the health insurance company may not cover the procedure. Not all services require pre-approval, but many may, and which require it can differ among insurers. Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc.

In some embodiments, a health insurance company may have many "features" of data on which health care pre-approval or reimbursement decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved or reimbursed, it may pre-approve or reimburse the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval or reimbursement may be flagged for human review.

Further, in some embodiments, the techniques herein can be used to flag trends, anomalies, and/or errors. For example, as explained in detail elsewhere herein, the techniques can be used to determine, for example, when there are anomalies for a request for pre-approval, diagnoses, reimbursement requests, etc. with respect to the computer-based reasoning model trained on prior data. When the anomaly is detected, (e.g., outliers, such as a procedure or prescription has been requested outside the normal range of occurrences per time period, for an individual that is outside the normal range of patients, etc.; and/or what may be referred to as "inliers"- or "contextual outliers," such as too frequently (or rarely) occurring diagnoses, procedures, prescriptions, etc.), the pre-approval, diagnosis, reimbursement request, etc. can be flagged for further review. In some cases, these anomalies could be errors (e.g., and the health professional or facility may be contacted to rectify the error), acceptable anomalies (e.g., patients that need care outside of the normal bounds), or unacceptable anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, reimbursement requests, diagnosis, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of a potential adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate synthetic data that mimics, but does not include previous patient data. This synthetic data generation is available for any of the uses of the techniques described herein (manufacturing, image labelling, self-driving vehicles, etc.), and can be particularly important in circumstances where using user data (such as patient health data) in a model may be contrary to policy or regulation. As discussed elsewhere herein, the synthetic data can be generated to directly mimic the characteristics of the patient population, or more surprising data can be generated (e.g., higher surprisal) in order to generate more data in the edge cases, all without a necessity of including actual patient data.

In some embodiments, processes 100, 400 may include determining (e.g., in response to a request) the surprisal and/or conviction of one or more data elements or aspects of the health care system. The surprisal and/or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling or causing control of the health care computer-based reasoning system using the health care system computer-based reasoning model.

In some embodiments, process 100 may determine (e.g., in response to a request) the search result (e.g., k nearest neighbors) in the computer-based reasoning model for use in the health care system computer-based reasoning model. Based on those search results, the process can cause 199 control of a health care computer-based reasoning system using process 400. For example, if the data elements are related to health care system actions, then the health care system computer-based reasoning model trained on that data will control the health care system. Process 400 proceeds by receiving 410 a health care system computer-based reasoning model. The process proceeds by receiving 420 a context. The health care system computer-based reasoning model is then used to determine 430 an action to take. The action is then performed by the control system (e.g., caused by the health care system computer-based reasoning system). If there are more 450 contexts to consider, then the system returns to receive 410 those contexts and otherwise ceases 460. In such embodiments, the health care system computer-based reasoning model may be used to assess health care decisions, predict outcomes, etc. In some embodiments, the chosen action(s) are then performed by a control system.

Financial Decision Making, Prediction, and Fraud Protection

The processes 100 and/or 400 may also be used for financial decision making, prediction (such as outcome or performance prediction), and/or fraud detection. For example, some financial systems require approval, certification, authorization, and/or reimbursement for certain types of financial transactions, such as loans, lines of credit, credit or charge approvals, etc. When analyzing approvals, a financial professional may determine, as one example, whether to approve prior to loaning money. Not all services or transactions require approval, but many may, and which require it can differ among financial system or institutions. Financial transaction companies may make determinations including, but not necessarily limited to, whether a loan appears to be viable, whether a charge is duplicative, whether a loan, charge, etc. follows currently-accepted practice, whether there are anomalies associated with the loan or charge, whether there are anomalies or errors with the any party to the loan, etc.

In some embodiments, a financial transaction company may have many "features" of data on which financial system decisions are determined by human operators. These features may include credit score, type of financial transaction (loan, credit card transaction, etc.), requesting financial system professional and/or facility (e.g., what bank, merchant, or other requestor), frequency and/or last financial transaction of the particular type, etc. The data on previous decisions can be used to train the computer-based reasoning system. The techniques herein may be used to guide the financial system decision making process. For example, when the computer-based reasoning model determines, with high conviction or confidence, that a financial transaction should be approved (e.g. with high conviction), it may the approve the transaction without further review (e.g., by a human operator). In some embodiments, when the computer-based reasoning model has low conviction re whether or not to approve a particular transaction, it may flag it for human review (including, e.g., sending it back to the submitting organization for further information or analysis). In some embodiments, some or all of the rejections of approvals may be flagged for human review.

Further, in some embodiments, the techniques herein can be used to flag trends, anomalies, and/or errors. For example, as explained in detail elsewhere herein, the techniques can be used to determine, for example, when there are anomalies for a request for approval, etc. with respect to the computer-based reasoning model trained on prior data. When the anomaly is detected, (e.g., outliers, such as a transaction has been requested outside the normal range of occurrences per time period, for an individual that is outside the normal range of transactions or approvals, etc.; and/or what may be referred to as "inliers"- or "contextual outliers," such as too frequently (or rarely) occurring types of transactions or approvals, unusual densities or changes to densities of the data, etc.), the approval may be flagged for further review. In some cases, these anomalies could be errors (e.g., and the financial professional or facility may be contacted to rectify the error), acceptable anomalies (e.g., transactions or approvals are legitimate, even if outside of the normal bounds), or unacceptable anomalies. Additionally, in some embodiments, the techniques herein can be used to determine and flag trends (e.g., for an individual customer or financial professional, set of individuals, financial department or facility, systems, etc.). The techniques herein may be useful not only because they can automate and/or flag approval decisions, transactions, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

In some embodiments, the techniques herein may be used to generate synthetic data that mimics, but does not include previous financial data. This synthetic data generation is available for any of the uses of the techniques described herein (manufacturing, image labelling, self-driving vehicles, etc.), and can be particularly important in circumstances where using user data (such as financial data) in a model may be contrary to contract, policy, or regulation. As discussed elsewhere herein, the synthetic data can be generated to directly mimic the characteristics of the financial transactions and/or users, or more surprising data can be generated (e.g., higher surprisal) in order to generate more data in the edge cases, all without including actual financial data.

In some embodiments, processes 100 and/or 400 may include determining (e.g., in response to a request) the surprisal and/or conviction of one or more data elements or aspects of the financial system. The surprisal and/or conviction for the one or more financial system data elements or aspects may be determined and a determination may be made whether to select or include the one or more financial system data elements or aspects in a financial system computer-based reasoning model based on the determined surprisal and/or conviction. While there are more sets of one or more financial system data elements or aspects to assess, the process may return to determine whether more financial system data elements or aspects should be included. Once there are no more financial system data elements or aspects to consider included in the model, the process can turn to controlling or causing control of the financial system computer-based reasoning system using the financial system computer-based reasoning model.

In some embodiments, processes 100 and/or 400 may determine (e.g., in response to a request) the search result (e.g., k nearest neighbors, most probable cases in gaussian process regression, etc.) in the computer-based reasoning model for use in the financial system computer-based reasoning model. Based on those search results, the process can cause control of a financial system computer-based reasoning system using process 400. For example, if the data elements are related to financial system actions, then the financial system computer-based reasoning model trained on that data will control the financial system. Process 400 proceeds by receiving 410 a financial system computer-based reasoning model. The process proceeds by receiving 420 a context. The financial system computer-based reasoning model is then used to determine 430 an action to take. The action is then performed by the control system (e.g., caused by the financial system computer-based reasoning system). If there are more 450 contexts to consider, then the system returns to receive 410 those contexts and otherwise ceases 460. In such embodiments, the financial system computer-based reasoning model may be used to assess financial system decisions, predict outcomes, etc. In some embodiments, the chosen action(s) are then performed by a control system.

Real Estate Future Value and Valuation Prediction

The techniques herein may also be used for real estate value estimation. For example, the past values and revenue from real estate ventures may be used as training data. This data may include, in addition to value (e.g., sale or resale value), compound annual growth rate ("CAGR"), zoning, property type (e.g., multifamily, Office, Retail, Industrial), adjacent business and types, asking rent (e.g., rent per square foot ("sqft") for each of Office, Retail, Industrial, etc. and/or per unit (for multifamily buildings), further, this may be based on all properties within the selected property type in a particular geography, for example), capitalization rate (or "cap rate" based on all properties within selected property type in a geography), demand (which may be quantified as occupied stock), market capitalization (e.g., an average modeled price per sqft multiplied by inventory sqft of the given property type and/or in a given geography), net absorption (net change in demand for a rolling 12 month period), net completions (e.g., net change in inventory sqft (Office, Retail, Industrial) or units (Multifamily) for a period of time, such as analyzed data element(s) rolling 12 month period), occupancy (e.g., Occupied sqft/total inventory sqft, 100%−vacancy %, etc.), stock (e.g., inventory square footage (Office, Retail, Industrial) or units (Multifamily), revenue (e.g., revenue generated by renting out or otherwise using a piece of real estate), savings (e.g., tax savings, depreciation), costs (e.g., taxes, insurance, upkeep, payments to property managers, costs for findings tenants, property managers, etc.), geography and geographic location (e.g., views of water, distance to shopping, walking score, proximity to public transportation, distance to highways, proximity to job centers, proximity to local universities, etc.), building characteristics (e.g., date built, date renovated, etc.), property characteristics (e.g., address, city, state, zip, property type, unit type(s), number of units, numbers of bedrooms and bathrooms, square footage(s), lot size(s), assessed value(s), lot value(s), improvements value(s), etc.—possibly including current and past values), real estate markets characteristics (e.g., local year-over-year growth, historical year-over-year growth), broader economic information (e.g., gross domestic product growth, consumer sentiment, economic forecast data), local economic information (e.g., local economic growth, average local salaries and growth, etc.), local demographics (e.g., numbers of families, couples, single people, number of working-age people, numbers or percentage of people with at different education, salary, or savings levels, etc.). The techniques herein may be used to train a real estate computer-based reasoning model based on previous properties. Once the real estate computer-based reasoning system has been trained, then input properties may be analyzed using the real estate reasoning system. Using the techniques herein, the surprisal and/or conviction of the training data can be used to build an real estate computer-based reasoning system that balances the size of the computer-based reasoning model with the information that each additional property record (or set of records) provides to the model.

The techniques herein may be used to predict performance of real estate in the future. For example, based on the variables associated discussed here, that are related, e.g., with various geographies, property types, and markets, the techniques herein may be used to find property types and geographies with the highest expected value or return (e.g., as CAGR). As a more specific example, a model of historical CAGR with asking rent, capitalization rate, demand, net absorption, net completions, occupancy, stock, etc. can be trained. That model may be used, along with more current data, to predict the CAGR of various property types and/or geographies over the coming X years (e.g., 2, 3, 5, or 10 years). Such information may be useful for predicting future value for properties and/or automated decision making.

As another example, using the techniques herein, a batch of available properties may be given as input to the real estate computer-based reasoning systems, and the real estate computer-based reasoning system may be used to determine what properties are likely to be good investments. In some embodiments, the predictions of the computer-based reasoning system may be used to purchase properties. Further, as discussed extensively herein, explanations may be provided for the decisions. Those explanation may be used by a controllable system to make investment decisions and/or by a human operator to review the investment predictions.

In some embodiments, processes 100, 400 may include determining the surprisal and/or conviction of each input real estate data element (or multiple real estate data elements) with respect to the associated labels or of the aspects of the computer-based reasoning model. The surprisal and/or conviction for the one or more real estate data elements may be determined and a determination may be made whether to select or include the one or more real estate data elements in the real estate computer-based reasoning model based on the determined surprisal and/or conviction. While there are more sets of one or more real estate data elements to assess, the process may return to determine whether more real estate data element sets should be included or whether aspects should be included and/or changed in the model. Once there are no more training cases to consider, the process can turn to controlling predicting real estate investments information for possible use in purchasing real estate using the real estate computer-based reasoning.

In some embodiments, process 100 may determine (e.g., in response to a request) the search result (e.g., k nearest neighbors) in the computer-based reasoning model for use in the real estate computer-based reasoning model. Based on those search results, the process can cause 199 control of a real estate system, using, for example, process 400. For example, the training data elements are related to real estate, and the real estate computer-based reasoning model trained on that data will determined investment value(s) for real estate data elements (properties) under consideration. These investment values may be any appropriate value, such as CAGR, monthly income, resale value, income or resale value based on refurbishment or new development, net present value of one or more of the preceding, etc. In some embodiments, process 400 begins by receiving 410 a real estate computer-based reasoning model. The process proceeds by receiving 420 properties under consideration for labeling and/or predicting value(s) for the investment opportunity. The real estate computer-based reasoning model is then used to determine 430 values for the real estate under consideration. The prediction(s) for the real estate is (are) then made 440. If there are more 450 properties to consider, then the system returns to receive 410 data on those properties and otherwise ceases 460. In some embodiments, the real estate computer-based reasoning model may be used to determine which training properties are "closest" (or most similar) to the incoming property or property types and/or geographies predicted as high value. The investment value (s) for the properties under consideration may then be determined based on the "closest" properties or property types and/or geographies.

Cybersecurity

The processes 100, 400 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the probability or likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DoS), distributed DOS (DDoS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 400 may include determining (e.g., in response to a request) the surprisal and/or conviction of one or more data elements or aspects of the cybersecurity system. The surprisal and/or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling or causing control of the cybersecurity computer-based reasoning system using the cybersecurity system computer-based reasoning model.

In some embodiments, process 100 may determine (e.g., in response to a request) the search result (e.g., k nearest neighbors) in the computer-based reasoning model for use in the cybersecurity system computer-based reasoning model. Based on those search results, the process can cause 199 control of a cybersecurity computer-based reasoning system using process 400. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 400 proceeds by receiving 410 a cybersecurity system computer-based reasoning model. The process proceeds by receiving 420 a context. The cybersecurity system computer-based reasoning model is then used to determine 430 an action to take. The action is then performed by the control system (e.g., caused by the cybersecurity system computer-based reasoning system). If there are more 450 contexts to consider, then the system returns to receive 410 those contexts and otherwise ceases 460. In such embodiments, the cybersecurity system computer-based reasoning model may be used to assess cybersecurity threats, etc. In some embodiments, the chosen action(s) are then performed by a control system.

Example Control Hierarchies

In some embodiments, the technique herein may use a control hierarchy to control systems and/or cause actions to be taken (e.g., as part of controlling or causing 199 control of, or causing 440 performance in FIG. 1 and FIG. 4). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
- Primitive Layer—Active vehicle abilities (accelerate, decelerate), lateral, elevation, and orientation movements to control basic vehicle navigation
- Behavior Layer—Programmed vehicle behaviors which prioritize received actions and directives and prioritize the behaviors in the action.
- Unit Layer—Receives orders from command layer, issues moves/directives to the behavior layer.
- Command Layers (hierarchical)—Receives orders and gives orders to elements under its command, which may be another command layer or unit layer.

Example Data Cases, Data Elements, Contexts, and Operational Situations

In some embodiments, the cases, data cases, or data elements may include context data and action data in context-action pairs. Various embodiments discussed herein may include any of the context data and actions associated with control of systems. For example, context data may include the state of machines and/or sensors in a manufacturing plant and the actions may include control of parts of the manufacturing system (e.g., speed of certain machinery, turning machinery on or off, signaling something for operator review, etc.). In some embodiments, cases may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the environment in which the system is operating.

In the vehicle context, the locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include system maintenance information. In the vehicle context, the context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include causing a control system to control the target system based on the identified action. In the self-controlled vehicle context, this may include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Numerous other examples of cases, data, contexts and actions are discussed herein.

Example of Certainty and Conviction

In some embodiments, certainty score is a broad term encompassing it plain and ordinary meaning, including the certainty (e.g., as a certainty function) that a particular set of data fits a model, the confidence that a particular set of data conforms to the model, or the importance of a feature or case with regard to the model. Determining a certainty score for a particular case can be accomplished by removing the particular case from the case-based or computer-based reasoning model and determining the conviction score of the particular case based on an entropy measure associated with adding that particular case back into the model. Any appropriate entropy measure, variance, confidence, and/or related method can be used for making this determination, such as the ones described herein. In some embodiments, certainty or conviction is determined by the expected information gain of adding the case to the model divided by the actual information gain of adding the case. For example, in some embodiments, certainty or conviction may be determined based on Shannon Entropy, Renyi entropy, Hartley entropy, min entropy, Collision entropy, Renyi divergence, diversity index, Simpson index, Gini coefficient, Kullback-Leibler divergence, Fisher information, Jensen-Shannon divergence, Symmetrised divergence. In some embodiments, certainty scores are conviction scores and are determined by calculating the entropy, comparing the ratio of entropies, and/or the like.

In some embodiments, the conviction of a case may be computed based on looking only at the K nearest neighbors when adding the feature back into the model. The K nearest neighbors can be determined using any appropriate distance measure, including use of Euclidean distance, 1-Kronecker delta, Minkowski distance, Damerau-Levenshtein distance, and/or any other distance measure, metric, pseudometric, premetric, index, or the like. In some embodiments, influence functions are used to determine the importance of a feature or case.

In some embodiments, determining certainty or conviction scores can include determining the conviction of each feature of multiple features of the cases in the computer-based reasoning model. In this context the word "feature" is being used to describe a data field as across all or some of the cases in the computer-based reasoning model. The word "field," in this context, is being used to describe the value of an individual case for a particular feature. For example, a feature for a theoretical computer-based reasoning model for self-driving cars may be "speed". The field value for a particular case for the feature of speed may be the actual speed, such as thirty-five miles per hour.

Returning to determining certainty or conviction scores, in some embodiments, determining the conviction of a feature may be accomplished by removing the feature from the computer-based reasoning model and determining a conviction score of the feature based on an entropy measure associated with adding the feature back into the computer-based reasoning model. For example, returning to the example above, removing a speed feature from a self-driving car computer-based reasoning model could include removing all of the speed values (e.g., fields) from cases from the computer-based reasoning model and determining the conviction of adding speed back into the computer-based reasoning model. The entropy measure used to determine the conviction score for the feature can be any appropriate entropy measure, such as those discussed herein. In some embodiments, the conviction of a feature may also be computed based on looking only at the K nearest neighbors when adding the feature back into the model. In some embodiments, the feature is not actually removed, but only temporarily excluded.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
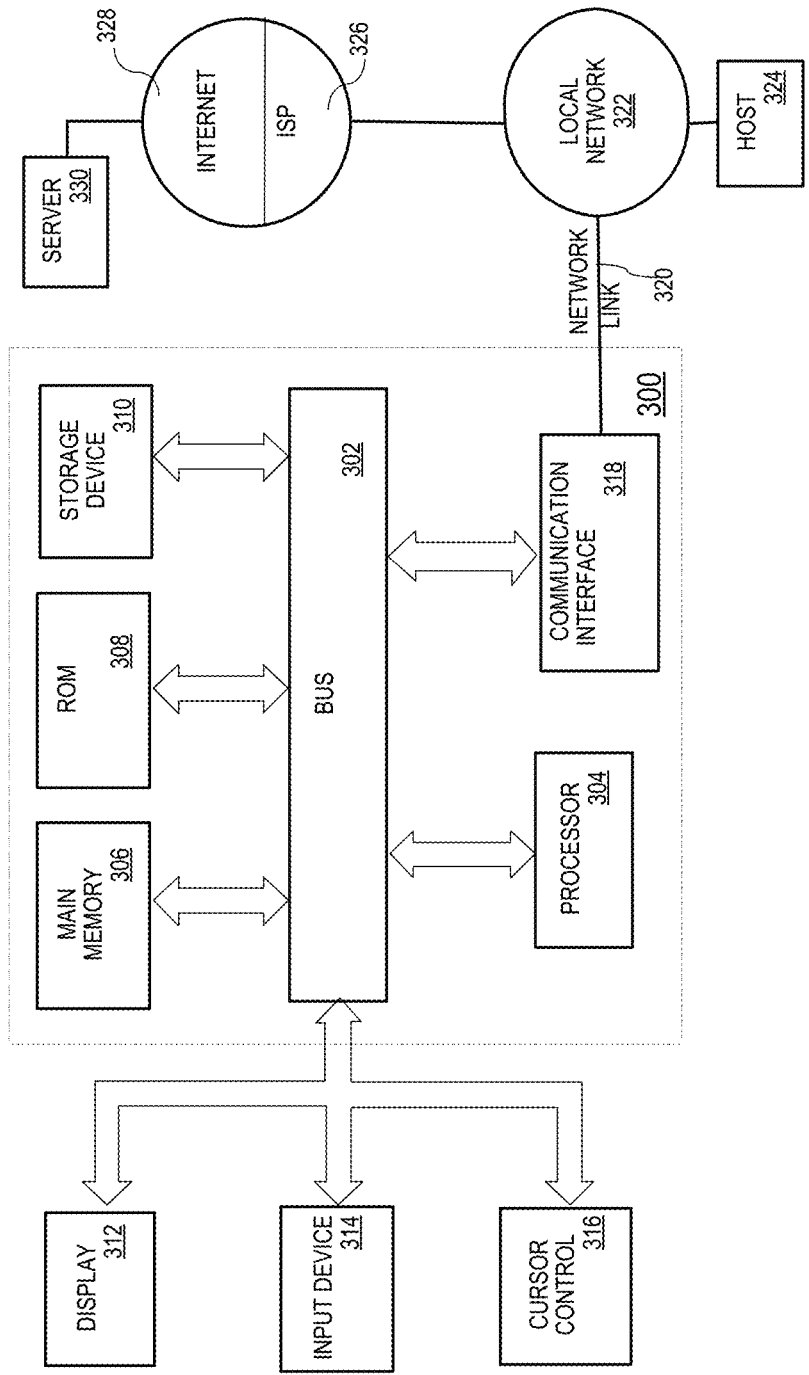
FIG. 3 is a block diagram of example hardware for improved searching and querying in computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or key-board. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving multiple new multidimensional data elements to store in a computer-based reasoning data model;
for each received multidimensional data element:
    determining a reference identifier for the multidimensional data element;
    for each dimension in the multidimensional data element:
        determining a feature bucket from a set of feature buckets for a value of the dimension of the multidimensional data element;
        store in a feature bucketed data structure, in a feature bucket corresponding to the determined feature bucket for the value of the dimension of the multidimensional data element, the reference identifier to the multidimensional data element;
receiving a query for nearest neighbor data elements to an input multidimensional data element;
for each feature in the input multidimensional data element:
    determining a feature bucket for a value of the feature of the input multidimensional data element;

determining from the feature bucket data structure, one or more multidimensional data elements that have related feature buckets with the input multidimensional data element;

ranking each candidate multidimensional data element of one or more candidate multidimensional data elements based at least in part on a number of feature buckets related to both the candidate multidimensional data element and the input multidimensional data element;

determining the nearest neighbor data elements based at least in part on the ranking of the one or more candidate multidimensional data elements;

returning the determined nearest neighbor data elements;

generating instructions for a controllable system based at least in part on the returned nearest neighbor data elements, wherein the controllable system is a type of system for autonomous vehicles, image labeling data, laboratory control, health care decision making, smart voice control, control of federated devices, manufacturing data, energy transfer systems, or smart home data;

causing control of a controllable system by transmitting the instructions to the controllable system.

2. The method of claim 1, wherein feature buckets in the set of feature buckets are strictly ordered and values in feature bucket i of the set of feature buckets are all greater than values in feature bucket i−1 in the set of feature buckets.

3. The method of claim 1, further comprising:
when a number of the one or more candidate multidimensional data elements is less than a threshold:
for each feature in the input multidimensional data element:
determining from the feature bucket data structure, one or more multidimensional data elements that are within a threshold number of feature buckets in the set of feature buckets from the determined feature bucket for the input multidimensional data element;
ranking one or more candidate multidimensional data elements based at least in part on a number of feature buckets within a threshold number of corresponding feature bucket of the input multidimensional data element.

4. The method of claim 1, further comprising:
determining that a number of items stored in a particular feature bucket is outside a threshold, revising a set of ranges for one or more feature buckets in the set of feature buckets.

5. The method of claim 1, further comprising:
for each of the one or more candidate multidimensional data elements:
determining a distance from the candidate multidimensional data element to the input multidimensional data element;
wherein determining the nearest neighbor data elements comprises determining the nearest neighbor data elements based at least in part on the distances from the one or more candidate multidimensional data elements to the input multidimensional data element.

6. The method of claim 1, wherein determining from the feature bucket data structure, one or more multidimensional data elements that have related feature buckets with the input multidimensional data element comprises determining from the feature bucket data structure, one or more multidimensional data elements that share the same feature buckets with the input multidimensional data element.

7. The method of claim 1, wherein determining from the feature bucket data structure, one or more multidimensional data elements that have related feature buckets with the input multidimensional data element comprises determining from the feature bucket data structure, one or more multidimensional data elements that have nearby feature buckets as compared to the input multidimensional data element.

8. The method of claim 1, wherein receiving the query for nearest neighbor data elements to the input multidimensional data element comprises receiving a query for results to a structured query.

9. The method of claim 1, wherein receiving the query for nearest neighbor data elements to the input multidimensional data element comprises receiving the query for k nearest neighbor data elements to the input multidimensional data element.

10. A system comprising one or more computing devices, which one or more computing devices are configured to perform a method of:
receiving multiple new multidimensional data elements to store in a computer-based reasoning data model;
for each received multidimensional data element:
determining a reference identifier for the multidimensional data element;
for each dimension in the multidimensional data element:
determining a feature bucket from a set of feature buckets for a value of the dimension of the multidimensional data element;
store in a feature bucketed data structure, in a feature bucket corresponding to the determined feature bucket for the value of the dimension of the multidimensional data element, the reference identifier to the multidimensional data element;
receiving a query for nearest neighbor data elements to an input multidimensional data element;
for each feature in the input multidimensional data element:
determining a feature bucket for a value of the feature of the input multidimensional data element;
determining from the feature bucket data structure, one or more multidimensional data elements that have related feature buckets with the input multidimensional data element;
ranking each candidate multidimensional data element of one or more candidate multidimensional data elements based at least in part on a number of feature buckets related to both the candidate multidimensional data element and the input multidimensional data element;
determining the nearest neighbor data elements based at least in part on the ranking of the one or more candidate multidimensional data elements;
returning the determined nearest neighbor data elements;
generating instructions for a controllable system based at least in part on the returned nearest neighbor data elements, wherein the controllable system is a type of system for autonomous vehicles, image labeling data, laboratory control, health care decision making, smart voice control, control of federated devices, manufacturing data, energy transfer systems, or smart home data;
causing control of a controllable system by transmitting the instructions to the controllable system.

11. The system of claim 10, wherein feature buckets in the set of feature buckets are strictly ordered and values in feature bucket i of the set of feature buckets are all greater than values in feature bucket i-1 in the set of feature buckets.

12. The system of claim 10, the method further comprising:
when a number of the one or more candidate multidimensional data elements is less than a threshold:
for each feature in the input multidimensional data element:
determining from the feature bucket data structure, one or more multidimensional data elements that are within a threshold number of feature buckets in the set of feature buckets from the determined feature bucket for the input multidimensional data element;
ranking one or more candidate multidimensional data elements based at least in part on a number of feature buckets within a threshold number of corresponding feature bucket of the input multidimensional data element.

13. The system of claim 10, wherein determining from the feature bucket data structure, one or more multidimensional data elements that have related feature buckets with the input multidimensional data element comprises determining from the feature bucket data structure, one or more multidimensional data elements that share the same feature buckets with the input multidimensional data element.

14. The system of claim 10, wherein determining from the feature bucket data structure, one or more multidimensional data elements that have related feature buckets with the input multidimensional data element comprises determining from the feature bucket data structure, one or more multidimensional data elements that have nearby feature buckets as compared to the input multidimensional data element.

15. The system of claim 10, wherein receiving the query for nearest neighbor data elements to the input multidimensional data element comprises receiving a query for results to a structured query.

16. One or more non-transitory storage media storing instructions which, when executed by one or more computing devices, cause performance of a method of:
receiving multiple new multidimensional data elements to store in a computer-based reasoning data model;
for each received multidimensional data element:
determining a reference identifier for the multidimensional data element;
for each dimension in the multidimensional data element:
determining a feature bucket from a set of feature buckets for a value of the dimension of the multidimensional data element;
store in a feature bucketed data structure, in a feature bucket corresponding to the determined feature bucket for the value of the dimension of the multidimensional data element, the reference identifier to the multidimensional data element;
receiving a query for nearest neighbor data elements to an input multidimensional data element;
for each feature in the input multidimensional data element:
determining a feature bucket for a value of the feature of the input multidimensional data element;
determining from the feature bucket data structure, one or more multidimensional data elements that have related feature buckets with the input multidimensional data element;
ranking each candidate multidimensional data element of one or more candidate multidimensional data elements based at least in part on a number of feature buckets related to both the candidate multidimensional data element and the input multidimensional data element;
determining the nearest neighbor data elements based at least in part on the ranking of the one or more candidate multidimensional data elements;
returning the determined nearest neighbor data elements;
generating instructions for a controllable system based at least in part on the returned nearest neighbor data elements, wherein the controllable system is a type of system for autonomous vehicles, image labeling data, laboratory control, health care decision making, smart voice control, control of federated devices, manufacturing data, energy transfer systems, or smart home data;
causing control of a controllable system by transmitting the instructions to the controllable system.

17. The one or more non-transitory storage media of claim 16, wherein feature buckets in the set of feature buckets are strictly ordered and values in feature bucket i of the set of feature buckets are all greater than values in feature bucket i-1 in the set of feature buckets.

18. The one or more non-transitory storage media of claim 16, the method further comprising:
when a number of the one or more candidate multidimensional data elements is less than a threshold:
for each feature in the input multidimensional data element:
determining from the feature bucket data structure, one or more multidimensional data elements that are within a threshold number of feature buckets in the set of feature buckets from the determined feature bucket for the input multidimensional data element;
ranking one or more candidate multidimensional data elements based at least in part on a number of feature buckets within a threshold number of corresponding feature bucket of the input multidimensional data element.

19. The one or more non-transitory storage media of claim 16, wherein determining from the feature bucket data structure, one or more multidimensional data elements that have related feature buckets with the input multidimensional data element comprises determining from the feature bucket data structure, one or more multidimensional data elements that share the same feature buckets with the input multidimensional data element.

20. The one or more non-transitory storage media of claim 16, wherein determining from the feature bucket data structure, one or more multidimensional data elements that have related feature buckets with the input multidimensional data element comprises determining from the feature bucket data structure, one or more multidimensional data elements that have nearby feature buckets as compared to the input multidimensional data element.

* * * * *